(12) United States Patent
Reeves et al.

(10) Patent No.: US 8,147,188 B2
(45) Date of Patent: Apr. 3, 2012

(54) AIR COOLED BUCKET FOR A TURBINE

(75) Inventors: Ian Reeves, Easley, SC (US); Daniel Tragesser, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1195 days.

(21) Appl. No.: 12/184,097

(22) Filed: Jul. 31, 2008

(65) Prior Publication Data
US 2010/0003127 A1    Jan. 7, 2010

Related U.S. Application Data

(60) Provisional application No. 60/976,238, filed on Sep. 28, 2007.

(51) Int. Cl.
*F02C 7/12* (2006.01)
*F01D 5/18* (2006.01)

(52) U.S. Cl. ..... 415/177; 415/191; 415/192; 415/208.1; 415/211.2; 416/92; 416/96 R; 416/97 R; 416/223 R; 416/243

(58) Field of Classification Search ..... 416/92, 416/96 R, 97 R, 223 R, 243; 415/177, 191, 415/192, 208.1, 211.2
See application file for complete search history.

(56) References Cited

U.S. PATENT DOCUMENTS

| | | | |
|---|---|---|---|
| 5,980,209 A | 11/1999 | Barry et al. | |
| 6,390,774 B1 | 5/2002 | Lewis et al. | |
| 6,418,804 B1 | 7/2002 | Zabala et al. | |
| 6,503,054 B1 * | 1/2003 | Bielek et al. | 415/191 |
| 6,884,038 B2 | 4/2005 | Hyde et al. | |
| 6,910,864 B2 * | 6/2005 | Tomberg | 416/90 R |
| 6,910,868 B2 | 6/2005 | Hyde et al. | |
| 6,923,623 B2 * | 8/2005 | Cleveland et al. | 416/97 R |
| 7,207,775 B2 | 4/2007 | Murrithi | |
| 7,618,240 B2 * | 11/2009 | Saltman et al. | 416/243 |
| 7,648,334 B2 * | 1/2010 | Hurst et al. | 415/115 |
| 2006/0045741 A1 | 3/2006 | Honkomp | |

* cited by examiner

*Primary Examiner* — Angel Roman
(74) *Attorney, Agent, or Firm* — Armstrong Teasdale LLP

(57) ABSTRACT

A bucket for a turbine is described. The bucket includes a dovetail portion configured to couple the bucket to a turbine wheel, the dovetail portion having a lower surface. The bucket also includes a shank portion that extends from the dovetail portion and an airfoil having a root and a tip portion, an airfoil shape, and a nominal profile substantially in accordance with Cartesian coordinate values of X, Y, and Z set forth in Table I. The bucket also includes a plurality of cooling passages. The plurality includes no more than five cooling passages that extend between the root and the tip portion of the airfoil. Each of the cooling passages exits the airfoil at the tip portion, the plurality of cooling passages are positioned in a camber line pattern.

20 Claims, 8 Drawing Sheets

AIR COOLED BUCKET FOR A TURBINE

CROSS REFERENCE TO RELATED APPLICATIONS

This application claims the benefit of U.S. Provisional Patent Application Ser. No. 60/976,238, filed on Sep. 28, 2007 titled Turbine Bucket Airfoil Cooling Hole Location, Style, and Configuration.

BACKGROUND OF THE INVENTION

The field of the invention relates generally to turbine buckets and, more particularly, to a turbine bucket that includes a cooling circuit with cooling holes sized and positioned to facilitate optimizing cooling ability and turbine efficiency.

In known gas turbine engines, combustion gases cause rotation of a turbine which drives a compressor. The compressor supplies pressurized air to a combustor which generates the combustion gases. Because such engines operate at relatively high temperatures, the capacity of such an engine may be limited by the materials used in fabricating the turbine blades, sometimes referred to herein as "buckets." More specifically, higher temperatures may cause thermal stresses to develop within the blades which may limit their operation. Such stresses may be more severe in industrial gas turbine engines because of the relatively large size of the turbine blades.

Turbines are designed to operate at a predetermined temperature that facilitates a desired performance and efficiency. Typically, newer turbines are designed to operate at higher temperatures, which necessitates greater cooling of the blades than blades used in turbines operating at lower temperatures. After continued exposure to high temperatures, turbine blades may require replacement.

To enable the turbines to operate with higher operating temperatures and increased engine efficiency without risking blade failure, at least some turbines use hollow, convectively-cooled turbine blades. At least some of such blades include interior cooling passageways which provide cooling flow to the interior of the blades to facilitate maintaining the blade at a relatively uniform temperature. Turbine air flow is diverted from a compressor into the interior passageways within the blades. When turbine blades are replaced, it may be desirable to maintain a substantially similar level of cooling flow as was previously present.

BRIEF DESCRIPTION OF THE INVENTION

In one aspect, a bucket for a turbine is provided. The bucket includes a dovetail portion configured to couple the bucket to a turbine wheel. The dovetail portion includes a lower surface. The bucket also includes a shank portion extending from the dovetail portion and an airfoil that includes a root portion, a tip portion, an airfoil shape, and a nominal profile substantially in accordance with Cartesian coordinate values of X, Y, and Z set forth in Table I. Z is a distance from the lower surface of the dovetail portion, and X and Y are coordinates defining the profile at each distance Z from the lower surface. The bucket also includes a plurality of cooling passages. The plurality of cooling passages includes no more than five cooling passages that extend between the root and the tip portion of the airfoil. Each of the cooling passages exits at said tip portion, and the plurality of cooling passages are positioned in a camber line pattern.

In another aspect, a gas turbine engine is provided. The gas turbine engine includes a rotor including at least one rotor wheel, and a plurality of buckets extending radially from the at least one rotor wheel. Each of the plurality of buckets includes a dovetail portion, a shank portion, an airfoil, and a plurality of cooling passages extending therethrough. The airfoil has a nominal profile formed substantially in accordance with Cartesian coordinate values of X, Y, and Z set forth in Table I, wherein Z is a distance from a lower surface of the dovetail portion, and X and Y are coordinates defining the profile at each distance Z from the lower surface. The plurality of cooling passages each extend between the lower surface of the dovetail portion and a tip portion of each airfoil. The plurality of cooling passages include no more than five cooling passages positioned in a camber line pattern.

DETAILED DESCRIPTION OF THE INVENTION

Figure 1:
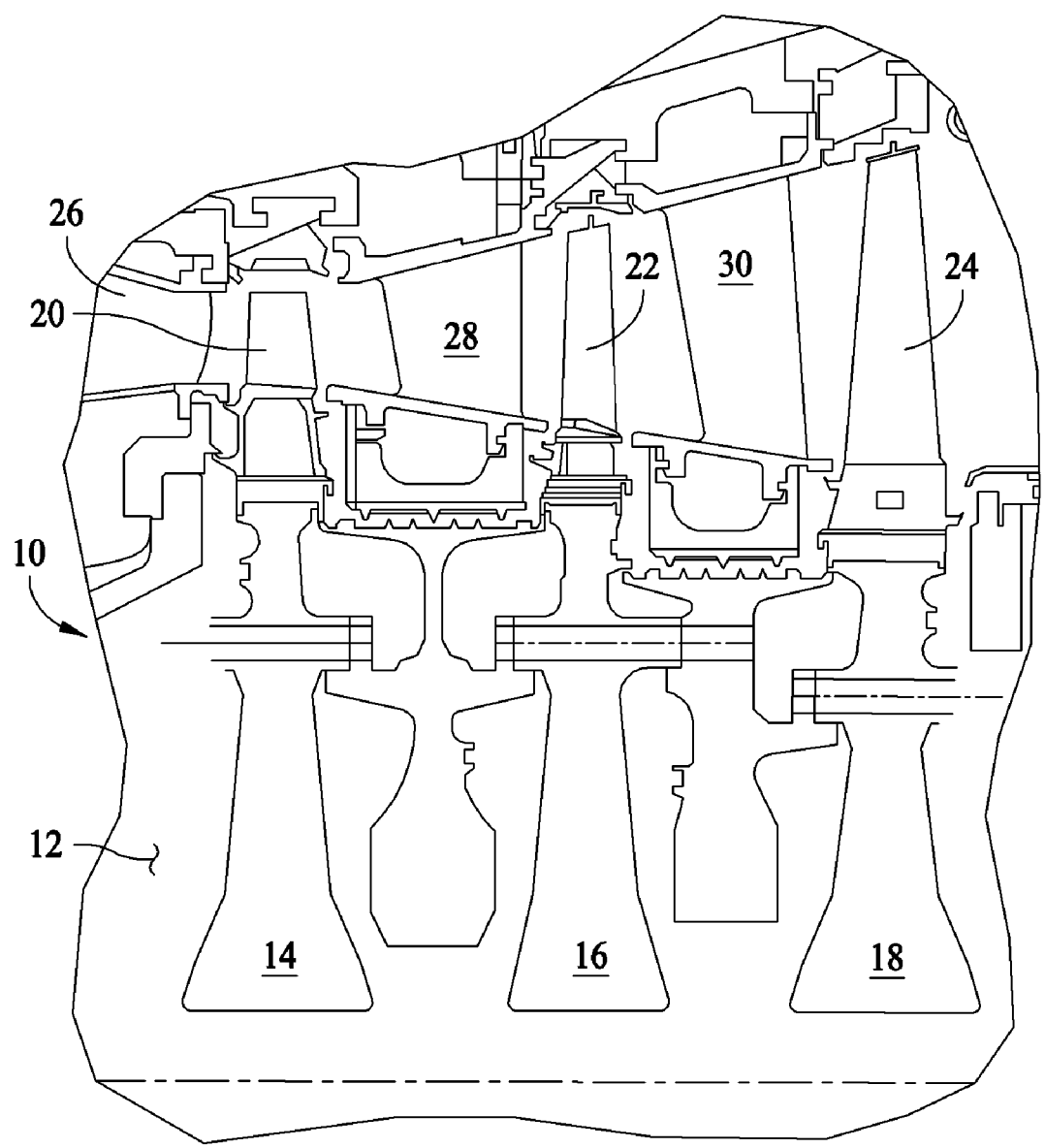
FIG. 1 is a schematic cross-sectional illustration of an exemplary turbine including a second stage turbine wheel.

FIG. 1 illustrates a cross-sectional view of an exemplary turbine 10. In the exemplary embodiment, turbine 10 includes a rotor 12 having respective first, second, and third stage rotor wheels 14, 16, and 18 that include respective buckets 20, 22, and 24 and respective stator vanes 26, 28, and 30. Each row of buckets 20, 22, and 24 and stator vanes 26, 28, and 30, defines a subsequent stage of turbine 10. In the exemplary embodiment, turbine 10 is a three stage turbine. Alternatively, turbine 10 may include more or less than three stages. In one embodiment, turbine 10 is a General Electric 6B gas turbine, manufactured by General Electric Company of Schenectady, N.Y.

Within the second turbine stage, rotor wheel 16 includes buckets 22 which are mounted in axially opposition to the upstream stator vanes 30. Buckets 22 are spaced circumferentially about the second stage wheel 16. In the exemplary embodiment, second stage wheel 16 includes ninety-two buckets 22.

Figure 2:
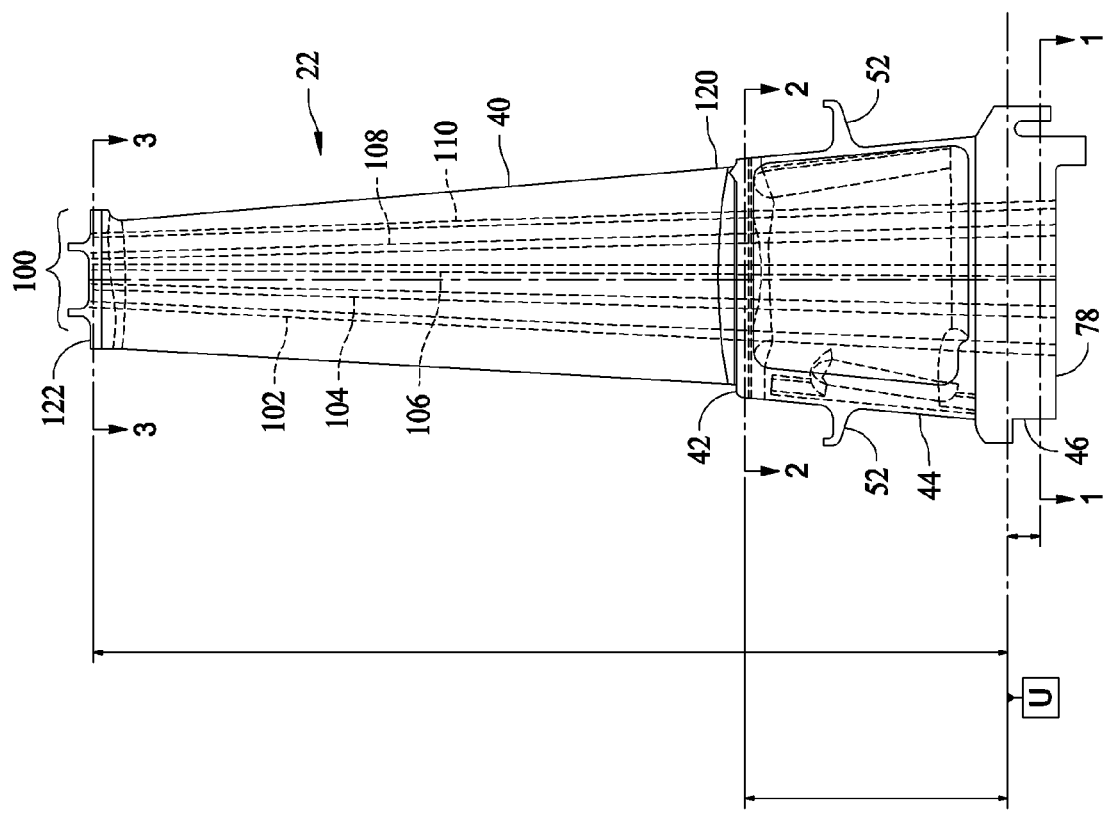
FIG. 2 is a front view of an exemplary turbine bucket that may be used within the turbine shown in FIG. 1.
Figure 3:
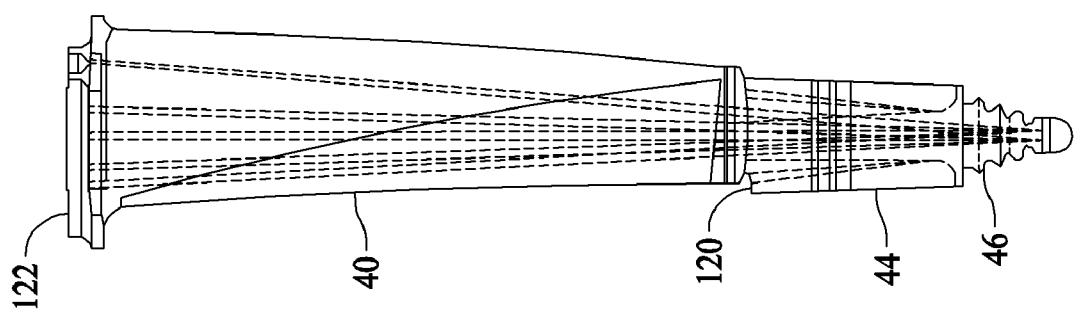
FIG. 3 is a side view of the turbine bucket shown in FIG. 2.

FIGS. 2 and 3 illustrate a perspective front view and a side view of an exemplary turbine bucket 22. In the exemplary embodiment, bucket 22 includes an airfoil 40 extending outward from a platform 42, and a shank 44 that extends outward from an opposite side of platform 42. The radial inner end of shank 44 extends from a dovetail 46 used for coupling the bucket 22 to turbine wheel 16 (shown in FIG. 1). As is known, dovetail 46 mates in corresponding dovetail openings (not shown) defined in turbine wheel 16. Bucket 22 also includes wheel space seals, i.e., angel wings 52, that extend axially outward from shank 44. In an example embodiment, airfoil 40 is fabricated from a known nickel-based superalloy, such as Alloy 738.

Figure 4:
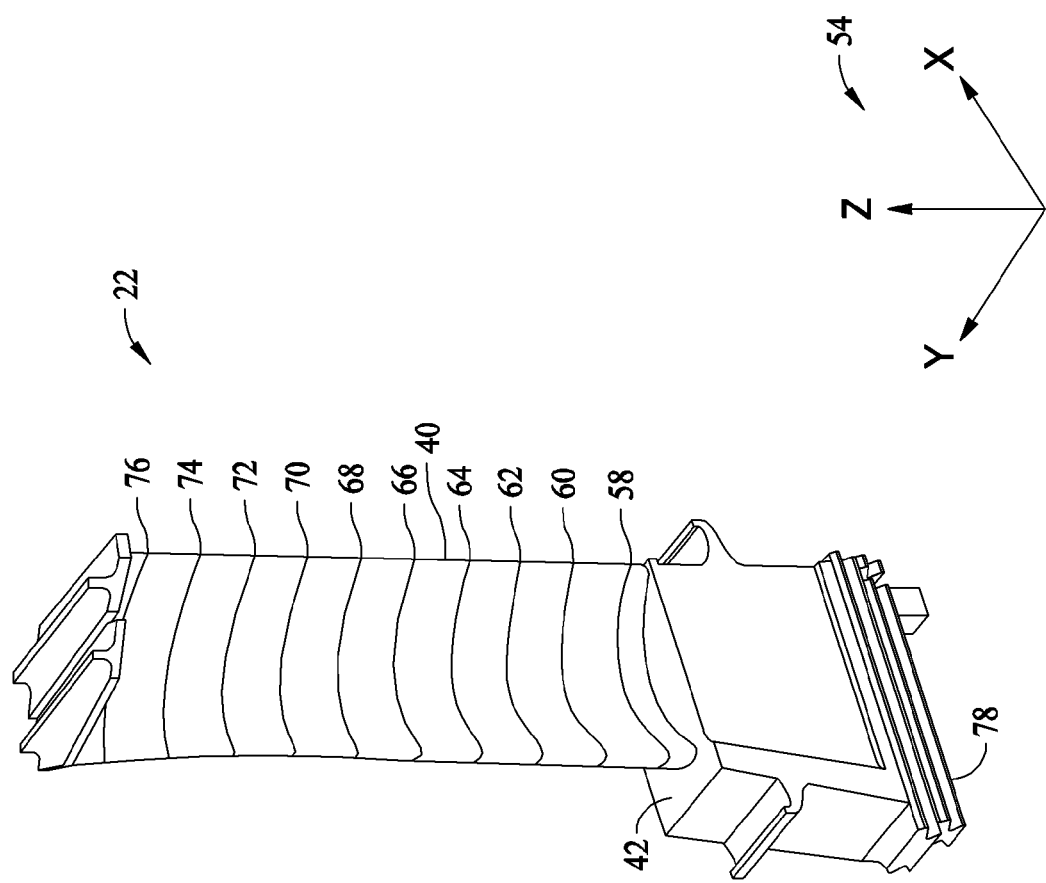
FIG. 4 illustrates a perspective view of the turbine bucket shown in FIG. 2 and illustrates a Cartesian coordinate system for X, Y, and Z values set forth in Table I.

FIG. 4 illustrates a perspective view of turbine bucket 22 shown in FIG. 2 and illustrates a Cartesian coordinate system 54 for X, Y, and Z values set forth in Table I which follows. The Cartesian coordinate system 54 has orthogonally related X, Y, and Z axes with the Z axis or datum lying substantially perpendicular to the platform 42 and extending generally in a radial direction through airfoil 40. A first section 58, a second section 60, a third section 62, a fourth section 64, a fifth section 66, a sixth section 68, a seventh section 70, an eighth section 72, a ninth section 74, and a tenth section 76 of airfoil 40 are illustrated.

Figure 5:
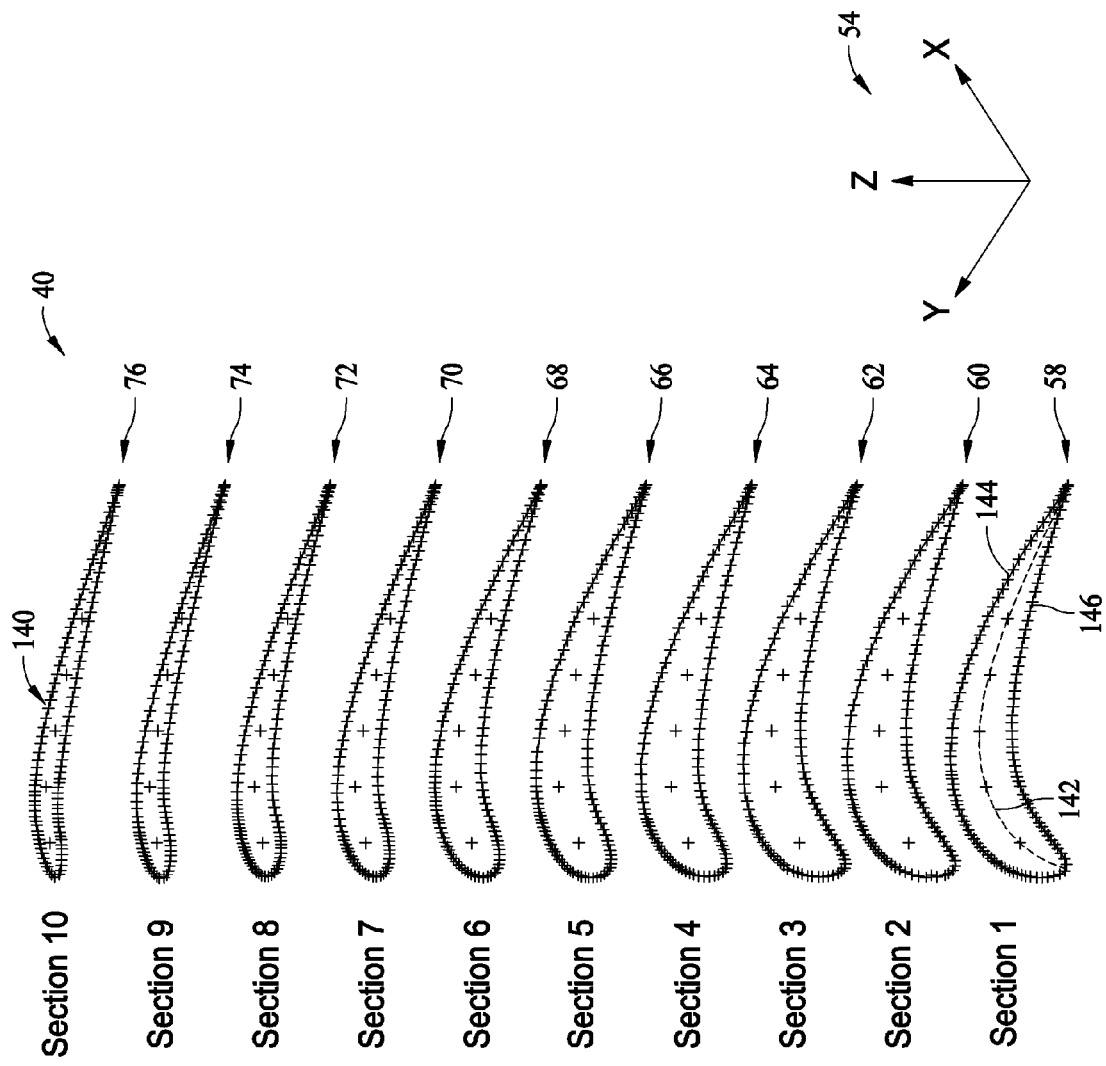
FIG. 5 is a diagram of cross-sections of the turbine bucket taken along lines shown in FIG. 4.

FIG. 5 is a diagram of cross-sections of airfoil 40 taken at first section 58, second section 60, third section 62, fourth section 64, fifth section 66, sixth section 68, seventh section 70, eighth section 72, ninth section 74, and tenth section 76. The Y axis extends substantially parallel to a centerline of the turbine, i.e., the rotary axis. By defining X and Y coordinate values at selected locations in the radial direction, i.e., in a Z direction, the profile of the airfoil 40 can be ascertained. By connecting the X and Y values with smooth continuing arcs, each profile section at each radial distance Z is fixed. The surface profiles at the various surface locations between the radial distances Z can be ascertained by connecting adjacent profiles. The X and Y coordinates for determining the airfoil section profile at each radial location or airfoil height Z are tabulated in the following Table I, wherein Z equals zero at a lower surface 78 of the bucket 22. These tabular values are given in inches and represent actual airfoil profiles at ambient, non-operating or non-hot conditions, and are for an uncoated airfoil. Airfoil 40 may be at least partially covered with a coating (not shown in FIG. 4), which may increase the dimensions of airfoil 40. In an exemplary embodiment, the coating protects airfoil 40 from corrosion and/or oxidation. Additionally, the sign convention used in Table I assigns a positive value to the value Z and positive and negative values for the coordinates X and Y, as typically used in a Cartesian coordinate system.

The values in Table 1 are computer-generated and shown to four decimal places. However, in view of manufacturing constraints, actual values useful for forming airfoil 40 are considered valid to only three decimal places for determining the profile of the airfoil 40. Moreover, there are typical manufacturing tolerances to be accounted for in the profile of airfoil 40. Accordingly, the values for the profile given in Table I are for a nominal airfoil. It should therefore be appreciated that plus or minus typical manufacturing tolerances are applicable to the X, Y, and Z values and that an airfoil having a profile substantially in accordance with those values includes such tolerances. For example, a manufacturing tolerance of about ±0.010 inches is within design limits for the airfoil and preferably a manufacturing tolerance of about ±0.008 inches is maintained. Accordingly, the values of X and Y carried to three decimal places and having a manufacturing tolerance about ±0.010 inches and preferably about ±0.008 inches are acceptable to define the profile of airfoil 40 at each radial position throughout its entire length.

Airfoil 40 imparts kinetic energy to the airflow and therefore contributes to a desired flow across a compressor (not shown). Airfoil 40 turns the fluid flow, slows relative velocity of the fluid flow, in the respective airfoil frame of reference, and yields a rise in the static pressure of the fluid flow. Airfoil 40, along with its interaction with surrounding airfoils and peripheral surfaces, facilitates, in certain exemplary embodiments: stage airflow efficiency, enhanced aeromechanics, smooth laminar flow from stage to stage, reduced thermal stresses, enhanced interrelation of the stages to effectively pass the airflow from stage to stage, and reduced mechanical stresses. Typically, multiple rows of airfoil stages, such as, but not limited to, rotor/stator airfoils, are oriented to achieve a desired discharge-to-inlet pressure ratio. Airfoils 40 can be coupled to wheels using dovetail 46 (shown in FIGS. 2 and 3).

The orientation of airfoil 40, and any interaction with surrounding airfoils, facilitates providing desirable fluid flow dynamics and laminar flow. Fluid flow intersects with airfoil 40 and is enhanced, and more specifically, the fluid dynamics and laminar flow from airfoil 40 are enhanced. As such, a smooth transition fluid flow to adjacent/downstream airfoils is facilitated. Moreover, flow from each airfoil 40 proceeds downstream towards the adjacent/downstream airfoils and is enhanced due to the enhanced laminar fluid flow from airfoil 40. Therefore, the orientation of airfoil 40 assists in preventing turbulent fluid flow in the unit comprising airfoil 40.

In the exemplary embodiment, the configuration of airfoil 40 (with or without fluid flow interaction) can be determined using various design processes and practices. Such design processes and practices may include any of, but also are not limited to only including: computational Fluid Dynamics (CFD); traditional fluid dynamics analysis; Euler and Navier-Stokes equations; manual positioning, flow testing (for example in wind tunnels), and modification of the airfoil; in-situ testing; modeling; application of scientific principles to design or develop the airfoils, machines, apparatus, or manufacturing processes; and airfoil flow testing and modification.

As noted above, the configuration of airfoil 40, and the interaction of airfoil 40 with surrounding airfoils and peripheral surfaces, facilitates stage airflow efficiency, enhanced aeromechanics, smooth laminar flow from stage-to-stage, reduced thermal stresses, enhanced interrelation of the stages to effectively pass the airflow from stage-to-stage, and reduced mechanical stresses, among other desirable effects, compared to other similar airfoils, which have like applications. In the exemplary embodiment, airfoil 40 facilitates increasing the efficiency of the turbine operation as compared to turbines using known airfoils. The increased efficiency provides, in addition to the above-noted advantages, an increased power output with a decrease in the amount of fuel required. As such, emissions produced from the engine are decreased.

As noted previously, airfoil 40 may also be coated for protection against corrosion and oxidation after airfoil 40 is manufactured, according to the values of Table I and within the tolerances explained above. Consequently, in addition to the manufacturing tolerances for the X and Y values set forth in Table I, there may also be an addition to those values to account for the coating thicknesses.

TABLE I

|  | Section 1 | | | Section 2 | | | Section 3 | | |
| --- | --- | --- | --- | --- | --- | --- | --- | --- | --- |
| Point | X | Y | Z | X | Y | Z | X | Y | Z |
| 1 | −1.2863 | −0.5237 | 4.3045 | −0.4461 | −0.1553 | 5.1101 | 0.0433 | −0.0905 | 5.9156 |
| 2 | −1.1988 | −0.3007 | 4.3045 | −0.8739 | 0.1801 | 5.1101 | −1.115 | −0.15 | 5.9156 |
| 3 | −0.1846 | −0.1543 | 4.3045 | −0.6366 | −0.2319 | 5.1101 | −1.1211 | −0.3644 | 5.9156 |
| 4 | −0.2999 | 0.5367 | 4.3045 | −0.1212 | −0.1009 | 5.1101 | −1.1587 | −0.2834 | 5.9156 |

TABLE I-continued

| | | | | | | | | |
|---|---|---|---|---|---|---|---|---|
| 5 | −0.9855 | 0.0244 | 4.3045 | −1.0812 | −0.1065 | 5.1101 | −0.5176 | −0.1255 | 5.9156 |
| 6 | −0.6967 | 0.3164 | 4.3045 | −1.2004 | −0.3626 | 5.1101 | −1.0141 | −0.3555 | 5.9156 |
| 7 | −0.8939 | −0.428 | 4.3045 | −1.1163 | −0.5101 | 5.1101 | −0.2816 | 0.5688 | 5.9156 |
| 8 | −1.2639 | −0.6589 | 4.3045 | −0.1882 | 0.5598 | 5.1101 | −0.771 | −0.2363 | 5.9156 |
| 9 | −1.2719 | −0.6549 | 4.3045 | −1.2158 | −0.4704 | 5.1101 | −0.5587 | 0.4798 | 5.9156 |
| 10 | −0.4196 | 0.4898 | 4.3045 | −0.7806 | 0.2746 | 5.1101 | −0.8064 | 0.2978 | 5.9156 |
| 11 | −1.1477 | −0.6294 | 4.3045 | −0.9349 | −0.4075 | 5.1101 | −0.1371 | −0.0659 | 5.9156 |
| 12 | −1.2949 | −0.597 | 4.3045 | −0.4733 | 0.4797 | 5.1101 | −1.0184 | 0.0305 | 5.9156 |
| 13 | −0.0521 | 0.5832 | 4.3045 | −0.7337 | 0.3155 | 5.1101 | −1.1401 | −0.2134 | 5.9156 |
| 14 | −1.2455 | −0.6631 | 4.3045 | −0.3166 | −0.1218 | 5.1101 | −1.0873 | −0.3701 | 5.9156 |
| 15 | −1.2657 | −0.4528 | 4.3045 | −0.9637 | 0.0706 | 5.1101 | −0.11 | 0.5753 | 5.9156 |
| 16 | 0.0245 | −0.1483 | 4.3045 | 0.0048 | −0.1069 | 5.1101 | −1.1605 | −0.3137 | 5.9156 |
| 17 | −1.1298 | −0.1801 | 4.3045 | −1.1475 | −0.2315 | 5.1101 | −0.9348 | −0.3211 | 5.9156 |
| 18 | −0.3224 | −0.176 | 4.3045 | −1.1692 | −0.5137 | 5.1101 | −0.3938 | 0.5452 | 5.9156 |
| 19 | −0.8772 | 0.1494 | 4.3045 | −0.0133 | 0.564 | 5.1101 | −0.6463 | −0.1763 | 5.9156 |
| 20 | −0.7018 | −0.312 | 4.3045 | −1.2149 | −0.4228 | 5.1101 | −0.6617 | 0.4179 | 5.9156 |
| 21 | −0.5587 | −0.2471 | 4.3045 | −1.0615 | −0.4867 | 5.1101 | −0.5825 | −0.1494 | 5.9156 |
| 22 | −0.5908 | 0.3938 | 4.3045 | −0.3051 | 0.5382 | 5.1101 | −0.3024 | −0.0742 | 5.9156 |
| 23 | −1.0273 | −0.5304 | 4.3045 | −1.208 | −0.4903 | 5.1101 | −0.8986 | 0.197 | 5.9156 |
| 24 | −1.2844 | −0.6415 | 4.3045 | −1.0355 | −0.4718 | 5.1101 | −0.0163 | −0.0784 | 5.9156 |
| 25 | −0.2381 | 0.5547 | 4.3045 | −0.8245 | −0.3362 | 5.1101 | −1.0856 | −0.0883 | 5.9156 |
| 26 | −1.1909 | −0.6545 | 4.3045 | −0.5813 | 0.4235 | 5.1101 | −1.1364 | −0.3565 | 5.9156 |
| 27 | −1.2928 | −0.5601 | 4.3045 | −0.5094 | −0.1772 | 5.1101 | 0.0615 | 0.5472 | 5.9156 |
| 28 | −1.2233 | −0.3504 | 4.3045 | −0.8254 | 0.2315 | 5.1101 | −1.1551 | −0.2646 | 5.9156 |
| 29 | −0.115 | −0.1487 | 4.3045 | −0.0694 | 0.5664 | 5.1101 | −1.0416 | −0.3639 | 5.9156 |
| 30 | −1.0363 | −0.0419 | 4.3045 | −0.1842 | −0.1036 | 5.1101 | −0.2245 | 0.5748 | 5.9156 |
| 31 | −0.4813 | −0.219 | 4.3045 | −1.0443 | −0.046 | 5.1101 | −0.8323 | −0.2683 | 5.9156 |
| 32 | −0.7595 | 0.2636 | 4.3045 | −1.1891 | −0.3291 | 5.1101 | −0.5044 | 0.5057 | 5.9156 |
| 33 | −0.8316 | −0.3865 | 4.3045 | −1.1339 | −0.5141 | 5.1101 | −0.4648 | −0.1089 | 5.9156 |
| 34 | −0.4783 | 0.4608 | 4.3045 | −0.1289 | 0.565 | 5.1101 | −0.7563 | 0.3441 | 5.9156 |
| 35 | −1.123 | −0.6106 | 4.3045 | −1.2173 | −0.4598 | 5.1101 | 0.0036 | 0.5606 | 5.9156 |
| 36 | −1.2933 | −0.6154 | 4.3045 | −0.9848 | −0.4402 | 5.1101 | −0.1924 | −0.0654 | 5.9156 |
| 37 | −0.1139 | 0.578 | 4.3045 | −0.4184 | 0.5025 | 5.1101 | −0.9809 | 0.0877 | 5.9156 |
| 38 | −1.2269 | −0.6637 | 4.3045 | −0.7004 | −0.2644 | 5.1101 | −1.1282 | −0.1814 | 5.9156 |
| 39 | −1.2771 | −0.488 | 4.3045 | −0.6849 | 0.3542 | 5.1101 | −1.1046 | −0.3688 | 5.9156 |
| 40 | −1.1724 | −0.2519 | 4.3045 | −0.3818 | −0.1368 | 5.1101 | −0.053 | 0.5698 | 5.9156 |
| 41 | −0.2538 | −0.1634 | 4.3045 | −0.92 | 0.1264 | 5.1101 | −1.1606 | −0.3024 | 5.9156 |
| 42 | −0.9322 | 0.0886 | 4.3045 | −0.0581 | −0.102 | 5.1101 | −0.9872 | −0.3449 | 5.9156 |
| 43 | −0.6345 | −0.2793 | 4.3045 | −1.1157 | −0.1683 | 5.1101 | −0.3381 | 0.5589 | 5.9156 |
| 44 | −0.6445 | 0.3563 | 4.3045 | −1.1859 | −0.5078 | 5.1101 | −0.4112 | −0.0947 | 5.9156 |
| 45 | −0.9543 | −0.4721 | 4.3045 | 0.0425 | 0.5581 | 5.1101 | −0.709 | −0.2054 | 5.9156 |
| 46 | −1.2788 | −0.6489 | 4.3045 | −1.2098 | −0.3967 | 5.1101 | −0.6111 | 0.4505 | 5.9156 |
| 47 | −0.3604 | 0.515 | 4.3045 | −1.0883 | −0.4999 | 5.1101 | −0.3571 | −0.0831 | 5.9156 |
| 48 | −1.1741 | −0.6461 | 4.3045 | −0.247 | 0.5509 | 5.1101 | −1.1554 | −0.3358 | 5.9156 |
| 49 | −1.2946 | −0.5785 | 4.3045 | −1.2129 | −0.4808 | 5.1101 | −0.8538 | 0.2486 | 5.9156 |
| 50 | 0.0099 | 0.5841 | 4.3045 | −0.885 | −0.3746 | 5.1101 | −0.0765 | −0.0702 | 5.9156 |
| 51 | −1.2457 | −0.4011 | 4.3045 | −0.5269 | 0.4538 | 5.1101 | −1.0534 | −0.0281 | 5.9156 |
| 52 | −0.0453 | −0.1467 | 4.3045 | −0.5715 | −0.2021 | 5.1101 | −1.1495 | −0.3451 | 5.9156 |
| 53 | −1.0844 | −0.11 | 4.3045 | −0.2507 | −0.1106 | 5.1101 | −1.1504 | −0.2461 | 5.9156 |
| 54 | −0.4024 | −0.1953 | 4.3045 | −1.0051 | 0.0131 | 5.1101 | −1.0699 | −0.3691 | 5.9156 |
| 55 | −1.099 | −0.5906 | 4.3045 | −1.1762 | −0.2961 | 5.1101 | −0.1673 | 0.577 | 5.9156 |
| 56 | −0.8197 | 0.2078 | 4.3045 | −1.1516 | −0.5157 | 5.1101 | −1.1589 | −0.325 | 5.9156 |
| 57 | −0.7676 | −0.3478 | 4.3045 | −1.2174 | −0.4492 | 5.1101 | −0.4485 | 0.5278 | 5.9156 |
| 58 | −0.5353 | 0.4287 | 4.3045 | −0.3623 | 0.5221 | 5.1101 | −0.71 | 0.3823 | 5.9156 |
| 59 | −1.2902 | −0.6289 | 4.3045 | −1.2012 | −0.498 | 5.1101 | −0.8833 | −0.2952 | 5.9156 |
| 60 | −0.1753 | 0.5686 | 4.3045 | −0.763 | −0.2993 | 5.1101 | −0.2475 | −0.0683 | 5.9156 |
| 61 | −1.2086 | −0.6607 | 4.3045 | −0.634 | 0.3902 | 5.1101 | −0.941 | 0.1433 | 5.9156 |
| 62 | 0.1332 | 0.5721 | 4.3045 | 1.2154 | −0.9757 | 5.1101 | 1.2034 | −1.0493 | 5.9156 |
| 63 | 1.3681 | −0.8619 | 4.3045 | 0.6142 | 0.2446 | 5.1101 | 1.209 | −1.0301 | 5.9156 |
| 64 | 0.1593 | −0.1619 | 4.3045 | 1.2621 | −0.9892 | 5.1101 | 0.3262 | −0.2069 | 5.9156 |
| 65 | 0.4104 | 0.4721 | 4.3045 | 0.3675 | 0.4441 | 5.1101 | 0.5892 | −0.4104 | 5.9156 |
| 66 | 1.3064 | −0.9038 | 4.3045 | 0.1909 | −0.145 | 5.1101 | 0.9255 | −0.3487 | 5.9156 |
| 67 | 0.6542 | 0.2873 | 4.3045 | 1.291 | −0.9507 | 5.1101 | 0.9136 | −0.7676 | 5.9156 |
| 68 | 1.2324 | −0.8528 | 4.3045 | 0.0977 | 0.5486 | 5.1101 | 1.1262 | −1.0195 | 5.9156 |
| 69 | 0.9218 | −0.032 | 4.3045 | 0.4816 | −0.2792 | 5.1101 | 1.1804 | −0.9489 | 5.9156 |
| 70 | 0.9982 | −0.6024 | 4.3045 | 1.2605 | −0.8676 | 5.1101 | 1.1396 | −1.0351 | 5.9156 |
| 71 | 1.2437 | −0.5656 | 4.3045 | 0.8101 | −0.5358 | 5.1101 | 0.6386 | 0.1329 | 5.9156 |
| 72 | 0.6659 | −0.3466 | 4.3045 | 1.0211 | −0.3656 | 5.1101 | 0.4757 | 0.3121 | 5.9156 |
| 73 | 1.3692 | −0.8165 | 4.3045 | 1.1577 | −0.9065 | 5.1101 | 1.1793 | −1.0629 | 5.9156 |
| 74 | 0.3516 | −0.2061 | 4.3045 | 0.7601 | 0.0683 | 5.1101 | 0.7188 | 0.0211 | 5.9156 |
| 75 | 0.2501 | 0.5429 | 4.3045 | 1.2322 | −0.9882 | 5.1101 | 0.1595 | −0.1259 | 5.9156 |
| 76 | 1.3496 | −0.8873 | 4.3045 | 0.5125 | 0.3407 | 5.1101 | 0.174 | 0.5089 | 5.9156 |
| 77 | 0.5118 | 0.407 | 4.3045 | 1.2788 | −0.9786 | 5.1101 | 1.0665 | −0.6643 | 5.9156 |
| 78 | 1.2767 | −0.8963 | 4.3045 | 0.2613 | 0.4976 | 5.1101 | 1.1613 | −1.0577 | 5.9156 |
| 79 | 0.7403 | 0.1979 | 4.3045 | 0.3111 | −0.1895 | 5.1101 | 0.2281 | 0.4844 | 5.9156 |
| 80 | 1.1917 | −0.8056 | 4.3045 | 1.2876 | −0.9286 | 5.1101 | 0.7087 | −0.5318 | 5.9156 |
| 81 | 1.059 | −0.2403 | 4.3045 | 0.6076 | −0.3652 | 5.1101 | 0.9744 | −0.4531 | 5.9156 |
| 82 | 0.8574 | −0.4793 | 4.3045 | 1.1785 | −0.6871 | 5.1101 | 1.0832 | −0.9694 | 5.9156 |
| 83 | 1.3298 | −0.7316 | 4.3045 | 0.9767 | −0.7022 | 5.1101 | 1.1528 | −0.8781 | 5.9156 |
| 84 | 0.5428 | −0.2807 | 4.3045 | 0.9057 | −0.1565 | 5.1101 | 1.1531 | −1.0511 | 5.9156 |

TABLE I-continued

| | | | | | | | | | |
|---|---|---|---|---|---|---|---|---|---|
| 85 | 0.0718 | 0.5804 | 4.3045 | 1.2082 | −0.9677 | 5.1101 | 0.5609 | 0.2258 | 5.9156 |
| 86 | 1.3725 | −0.8468 | 4.3045 | 0.0673 | −0.1156 | 5.1101 | 0.7604 | −0.0438 | 5.9156 |
| 87 | 0.2241 | −0.1735 | 4.3045 | 0.6613 | 0.1929 | 5.1101 | 1.197 | −1.0564 | 5.9156 |
| 88 | 0.2882 | −0.1883 | 4.3045 | 1.2523 | −0.9912 | 5.1101 | 0.333 | 0.4242 | 5.9156 |
| 89 | 0.3585 | 0.4992 | 4.3045 | 0.129 | −0.1282 | 5.1101 | 1.0212 | −0.5584 | 5.9156 |
| 90 | 1.3218 | −0.9018 | 4.3045 | 1.2891 | −0.9616 | 5.1101 | 0.2815 | 0.4559 | 5.9156 |
| 91 | 0.6086 | 0.3293 | 4.3045 | 0.1523 | 0.5356 | 5.1101 | 0.8404 | −0.6808 | 5.9156 |
| 92 | 1.253 | −0.8761 | 4.3045 | 0.4262 | −0.2467 | 5.1101 | 1.1329 | −1.0272 | 5.9156 |
| 93 | 0.8641 | 0.0469 | 4.3045 | 1.279 | −0.9076 | 5.1101 | 0.6749 | 0.0844 | 5.9156 |
| 94 | 1.0648 | −0.6681 | 4.3045 | 0.7446 | −0.4766 | 5.1101 | 0.8 | −0.1101 | 5.9156 |
| 95 | 1.1844 | −0.4559 | 4.3045 | 1.0751 | −0.472 | 5.1101 | 1.17 | −1.0617 | 5.9156 |
| 96 | 0.7252 | −0.3835 | 4.3045 | 1.1073 | −0.8474 | 5.1101 | 0.2722 | −0.1766 | 5.9156 |
| 97 | 1.3635 | −0.802 | 4.3045 | 0.8111 | −0.005 | 5.1101 | 0.102 | −0.1064 | 5.9156 |
| 98 | 0.4141 | −0.2269 | 4.3045 | 0.4178 | 0.4124 | 5.1101 | 1.2076 | −1.0406 | 5.9156 |
| 99 | 0.1939 | 0.5592 | 4.3045 | 1.2233 | −0.9829 | 5.1101 | 0.3786 | −0.24 | 5.9156 |
| 100 | 1.3602 | −0.8757 | 4.3045 | 0.5647 | 0.294 | 5.1101 | 1.1957 | −0.9884 | 5.9156 |
| 101 | 0.0941 | −0.1536 | 4.3045 | 1.2712 | −0.9848 | 5.1101 | 1.2034 | −1.0091 | 5.9156 |
| 102 | 0.4605 | 0.442 | 4.3045 | 0.3152 | 0.4726 | 5.1101 | 0.65 | −0.4701 | 5.9156 |
| 103 | 1.291 | −0.902 | 4.3045 | 0.2516 | −0.1655 | 5.1101 | 0.9864 | −0.8547 | 5.9156 |
| 104 | 0.698 | 0.2434 | 4.3045 | 1.2903 | −0.9396 | 5.1101 | 0.5261 | −0.3531 | 5.9156 |
| 105 | 1.2122 | −0.8291 | 4.3045 | 0.5356 | −0.314 | 5.1101 | 0.8378 | −0.1774 | 5.9156 |
| 106 | 0.9921 | −0.135 | 4.3045 | 1.2281 | −0.7958 | 5.1101 | 1.1461 | −1.0432 | 5.9156 |
| 107 | 0.9291 | −0.5393 | 4.3045 | 0.8948 | −0.6176 | 5.1101 | 0.6006 | 0.1801 | 5.9156 |
| 108 | 1.3015 | −0.6761 | 4.3045 | 0.9648 | −0.2603 | 5.1101 | 1.1887 | −1.0611 | 5.9156 |
| 109 | 0.6051 | −0.3122 | 4.3045 | 1.2012 | −0.9594 | 5.1101 | 1.1104 | −0.7708 | 5.9156 |
| 110 | 1.3728 | −0.8315 | 4.3045 | 0.7061 | 0.1392 | 5.1101 | 0.3826 | 0.3895 | 5.9156 |
| 111 | 0.305 | 0.5229 | 4.3045 | 1.2424 | −0.991 | 5.1101 | 0.2167 | −0.1495 | 5.9156 |
| 112 | 1.3366 | −0.8961 | 4.3045 | 0.4661 | 0.3779 | 5.1101 | 0.1183 | 0.5299 | 5.9156 |
| 113 | 0.5612 | 0.3693 | 4.3045 | 1.2849 | −0.9706 | 5.1101 | 0.4786 | −0.3135 | 5.9156 |
| 114 | 1.2642 | −0.8871 | 4.3045 | 0.2058 | 0.519 | 5.1101 | 1.2071 | −1.0195 | 5.9156 |
| 115 | 1.3571 | −0.7877 | 4.3045 | 0.3693 | −0.2167 | 5.1101 | 0.4294 | −0.2757 | 5.9156 |
| 116 | 0.8038 | 0.1237 | 4.3045 | 1.2837 | −0.918 | 5.1101 | 0.7659 | −0.595 | 5.9156 |
| 117 | 1.1291 | −0.736 | 4.3045 | 0.6771 | −0.4195 | 5.1101 | 0.8739 | −0.2456 | 5.9156 |
| 118 | 1.123 | −0.3473 | 4.3045 | 1.1275 | −0.5792 | 5.1101 | 1.1995 | −0.9987 | 5.9156 |
| 119 | 0.7828 | −0.423 | 4.3045 | 1.0561 | −0.789 | 5.1101 | 0.5193 | 0.2699 | 5.9156 |
| 120 | 0.4791 | −0.2523 | 4.3045 | 0.8595 | −0.0801 | 5.1101 | 0.4302 | 0.352 | 5.9156 |
| Hole 1 | −0.663 | −0.0626 | 4.3045 | −0.2702 | 0.1279 | 5.1101 | −0.5863 | 0.0714 | 5.9156 |
| Hole 2 | −0.2928 | 0.102 | 4.3045 | −0.6246 | 0.0044 | 5.1101 | −0.2477 | 0.1538 | 5.9156 |
| Hole 3 | 0.4613 | 0.0371 | 4.3045 | 0.8424 | −0.3783 | 5.1101 | 0.4303 | −0.0478 | 5.9156 |
| Hole 4 | 0.8746 | −0.3089 | 4.3045 | 0.4458 | −0.0054 | 5.1101 | 0.8101 | −0.4478 | 5.9156 |
| Hole 5 | 0.0875 | 0.1167 | 4.3045 | 0.0965 | 0.0998 | 5.1101 | 0.1055 | 0.0828 | 5.9156 |

| | Section 4 | | | Section 5 | | | Section 6 | | |
|---|---|---|---|---|---|---|---|---|---|
| Point | X | Y | Z | X | Y | Z | X | Y | Z |
| 1 | −0.9981 | −0.2284 | 6.7212 | −0.6613 | −0.04 | 7.5267 | −1.0043 | 0.1373 | 8.3323 |
| 2 | −1.1125 | −0.1884 | 6.7212 | −0.6656 | 0.4981 | 7.5267 | −1.0263 | 0.0535 | 8.3323 |
| 3 | −0.7868 | −0.1582 | 6.7212 | −0.8611 | 0.3293 | 7.5267 | −0.6842 | 0.0523 | 8.3323 |
| 4 | −0.7015 | 0.4419 | 6.7212 | −1.0014 | 0.1286 | 7.5267 | −0.6058 | 0.5504 | 8.3323 |
| 5 | −0.9052 | 0.2461 | 6.7212 | −1.0396 | −0.1022 | 7.5267 | −0.798 | 0.4131 | 8.3323 |
| 6 | −1.0705 | −0.0172 | 6.7212 | −1.0629 | −0.0184 | 7.5267 | −0.8663 | 0.3425 | 8.3323 |
| 7 | −1.0596 | −0.228 | 6.7212 | −0.962 | −0.1145 | 7.5267 | −0.951 | 0.2319 | 8.3323 |
| 8 | −1.1146 | −0.1586 | 6.7212 | −1.0635 | −0.0781 | 7.5267 | −1.0123 | 0.0196 | 8.3323 |
| 9 | −1.1033 | −0.2055 | 6.7212 | −1.0528 | −0.0933 | 7.5267 | −1.0205 | 0.0935 | 8.3323 |
| 10 | −0.6617 | −0.1106 | 6.7212 | −0.8337 | −0.086 | 7.5267 | −0.9584 | 0.0019 | 8.3323 |
| 11 | −0.5739 | 0.5197 | 6.7212 | −0.5213 | 0.5678 | 7.5267 | −1.0226 | 0.0351 | 8.3323 |
| 12 | −0.7891 | 0.37 | 6.7212 | −0.5361 | −0.018 | 7.5267 | −0.8292 | 0.0219 | 8.3323 |
| 13 | −0.9728 | 0.1551 | 6.7212 | −0.7526 | 0.4354 | 7.5267 | −0.5752 | 0.065 | 8.3323 |
| 14 | −1.0954 | −0.0785 | 6.7212 | −0.9243 | 0.2501 | 7.5267 | −0.683 | 0.5052 | 8.3323 |
| 15 | −0.5339 | −0.0713 | 6.7212 | −1.0369 | 0.057 | 7.5267 | −0.9908 | 0.1652 | 8.3323 |
| 16 | −1.026 | −0.2307 | 6.7212 | −1.0101 | −0.1126 | 7.5267 | −0.9923 | 0.0079 | 8.3323 |
| 17 | −1.1144 | −0.1785 | 6.7212 | −1.0675 | −0.0499 | 7.5267 | −1.0261 | 0.0629 | 8.3323 |
| 18 | −0.9439 | −0.2157 | 6.7212 | −0.9305 | −0.1102 | 7.5267 | −0.9194 | 0.004 | 8.3323 |
| 19 | −0.8387 | −0.1788 | 6.7212 | −0.7191 | −0.0539 | 7.5267 | −0.7411 | 0.0416 | 8.3323 |
| 20 | −0.6605 | 0.4702 | 6.7212 | −0.6192 | 0.5248 | 7.5267 | −0.5651 | 0.5693 | 8.3323 |
| 21 | −0.8685 | 0.2892 | 6.7212 | −0.8658 | −0.0949 | 7.5267 | −0.7614 | 0.4459 | 8.3323 |
| 22 | −1.0411 | 0.042 | 6.7212 | −0.8268 | 0.3666 | 7.5267 | −0.9245 | 0.27 | 8.3323 |
| 23 | −1.0755 | −0.2233 | 6.7212 | −0.9774 | 0.1702 | 7.5267 | −0.9813 | 0.0047 | 8.3323 |
| 24 | −1.1111 | −0.1341 | 6.7212 | −1.0589 | −0.0029 | 7.5267 | −1.0158 | 0.1084 | 8.3323 |
| 25 | −0.9708 | −0.223 | 6.7212 | −0.978 | −0.1152 | 7.5267 | −0.9699 | 0.0028 | 8.3323 |
| 26 | −1.1089 | −0.1976 | 6.7212 | −1.0663 | −0.0689 | 7.5267 | −1.0253 | 0.0442 | 8.3323 |
| 27 | −0.7244 | −0.1338 | 6.7212 | −0.5989 | −0.0275 | 7.5267 | −0.8608 | 0.0148 | 8.3323 |
| 28 | −0.5286 | 0.5404 | 6.7212 | −0.7102 | 0.4682 | 7.5267 | −0.6268 | 0.0603 | 8.3323 |
| 29 | −0.7463 | 0.4072 | 6.7212 | −0.898 | −0.1032 | 7.5267 | −0.6451 | 0.5289 | 8.3323 |
| 30 | −0.94 | 0.2013 | 6.7212 | −0.8936 | 0.2904 | 7.5267 | −0.833 | 0.3786 | 8.3323 |
| 31 | −1.0836 | −0.0476 | 6.7212 | −1.0235 | 0.086 | 7.5267 | −0.9757 | 0.1924 | 8.3323 |
| 32 | −1.0429 | −0.2303 | 6.7212 | −1.0659 | −0.034 | 7.5267 | −1.0028 | 0.0128 | 8.3323 |
| 33 | −1.115 | −0.1685 | 6.7212 | −0.9462 | −0.1128 | 7.5267 | −1.024 | 0.0784 | 8.3323 |
| 34 | −0.8909 | −0.1984 | 6.7212 | −1.059 | −0.0865 | 7.5267 | −0.9468 | 0.0019 | 8.3323 |

TABLE I-continued

| | | | | | | | | | |
|---|---|---|---|---|---|---|---|---|---|
| 35 | −0.5982 | −0.0896 | 6.7212 | −0.7765 | −0.0696 | 7.5267 | −1.0184 | 0.0267 | 8.3323 |
| 36 | −0.6179 | 0.4962 | 6.7212 | −0.571 | 0.5481 | 7.5267 | −0.8925 | 0.0082 | 8.3323 |
| 37 | −0.8298 | 0.3306 | 6.7212 | −1.0253 | −0.1085 | 7.5267 | −0.7976 | 0.0292 | 8.3323 |
| 38 | −1.0085 | 0.0994 | 6.7212 | −0.7906 | 0.4021 | 7.5267 | −0.7231 | 0.4767 | 8.3323 |
| 39 | −1.0903 | −0.216 | 6.7212 | −0.9517 | 0.2107 | 7.5267 | −0.8962 | 0.3069 | 8.3323 |
| 40 | −1.1053 | −0.11 | 6.7212 | −1.0488 | 0.0274 | 7.5267 | 0.0185 | 0.5357 | 8.3323 |
| 41 | −0.2405 | 0.6006 | 6.7212 | −0.9942 | −0.1147 | 7.5267 | 0.0299 | −0.0727 | 8.3323 |
| 42 | −0.482 | 0.5583 | 6.7212 | −1.0675 | −0.0594 | 7.5267 | −0.1377 | 0.0051 | 8.3323 |
| 43 | −0.4686 | −0.0563 | 6.7212 | −0.3458 | −0.0095 | 7.5267 | −0.1876 | 0.6104 | 8.3323 |
| 44 | 0.0509 | 0.548 | 6.7212 | −0.0338 | −0.0688 | 7.5267 | −0.3925 | 0.617 | 8.3323 |
| 45 | −0.0929 | 0.5879 | 6.7212 | −0.011 | 0.5591 | 7.5267 | −0.4718 | 0.0677 | 8.3323 |
| 46 | −0.3379 | 0.5933 | 6.7212 | −0.3211 | 0.6074 | 7.5267 | −0.0624 | 0.5735 | 8.3323 |
| 47 | −0.1578 | −0.0417 | 6.7212 | −0.2706 | 0.6084 | 7.5267 | −0.2691 | 0.621 | 8.3323 |
| 48 | −0.1916 | 0.5996 | 6.7212 | −0.2191 | −0.0221 | 7.5267 | −0.4806 | 0.5992 | 8.3323 |
| 49 | −0.4345 | 0.5732 | 6.7212 | 0.0819 | −0.1171 | 7.5267 | −0.3175 | 0.053 | 8.3323 |
| 50 | −0.2825 | −0.036 | 6.7212 | −0.114 | 0.5897 | 7.5267 | −0.0237 | −0.044 | 8.3323 |
| 51 | −0.22 | −0.0368 | 6.7212 | −0.3714 | 0.6029 | 7.5267 | 0.0573 | 0.5135 | 8.3323 |
| 52 | 0.0738 | −0.0985 | 6.7212 | −0.4094 | −0.0088 | 7.5267 | −0.1475 | 0.6013 | 8.3323 |
| 53 | −0.0442 | 0.5774 | 6.7212 | −0.0947 | −0.0495 | 7.5267 | −0.3515 | 0.621 | 8.3323 |
| 54 | −0.2893 | 0.5985 | 6.7212 | 0.0389 | 0.5389 | 7.5267 | −0.1967 | 0.0246 | 8.3323 |
| 55 | 0.0181 | −0.0791 | 6.7212 | −0.2201 | 0.6059 | 7.5267 | −0.0214 | 0.5558 | 8.3323 |
| 56 | −0.407 | −0.0459 | 6.7212 | 0.0874 | 0.5155 | 7.5267 | −0.2282 | 0.617 | 8.3323 |
| 57 | −0.0961 | −0.0508 | 6.7212 | −0.4703 | 0.5836 | 7.5267 | −0.4369 | 0.6096 | 8.3323 |
| 58 | −0.1421 | 0.5953 | 6.7212 | −0.2823 | −0.0139 | 7.5267 | −0.3687 | 0.0605 | 8.3323 |
| 59 | −0.3861 | 0.585 | 6.7212 | 0.0247 | −0.0913 | 7.5267 | −0.1045 | 0.5888 | 8.3323 |
| 60 | −0.3449 | −0.039 | 6.7212 | −0.062 | 0.5761 | 7.5267 | −0.3103 | 0.6223 | 8.3323 |
| 61 | 0.0038 | 0.5641 | 6.7212 | −0.4729 | −0.0117 | 7.5267 | −0.5234 | 0.5857 | 8.3323 |
| 62 | −0.0386 | −0.0632 | 6.7212 | −0.1565 | −0.0339 | 7.5267 | −0.4201 | 0.0654 | 8.3323 |
| 63 | 0.5121 | −0.4022 | 6.7212 | −0.1668 | 0.5997 | 7.5267 | −0.5235 | −0.0675 | 8.3323 |
| 64 | 0.2335 | −0.1761 | 6.7212 | −0.4212 | 0.595 | 7.5267 | −0.08 | −0.0178 | 8.3323 |
| 65 | 0.3917 | 0.332 | 6.7212 | 0.4302 | 0.2293 | 7.5267 | −0.2567 | 0.0406 | 8.3323 |
| 66 | 0.3803 | −0.2798 | 6.7212 | 0.2284 | 0.4257 | 7.5267 | 0.2785 | −0.2628 | 8.3323 |
| 67 | 0.4698 | −0.3597 | 6.7212 | 0.239 | −0.2112 | 7.5267 | 0.5138 | −0.5433 | 8.3323 |
| 68 | 0.1812 | −0.1469 | 6.7212 | 0.4538 | −0.4053 | 7.5267 | 0.5465 | −0.0571 | 8.3323 |
| 69 | 0.5219 | 0.1929 | 6.7212 | 0.5477 | 0.0694 | 7.5267 | 0.3347 | 0.2649 | 8.3323 |
| 70 | 0.3023 | 0.4075 | 6.7212 | 0.3546 | 0.3135 | 7.5267 | 0.1311 | 0.4634 | 8.3323 |
| 71 | 0.1043 | 0.5261 | 6.7212 | 0.1362 | 0.4883 | 7.5267 | 0.1322 | −0.1386 | 8.3323 |
| 72 | 0.1282 | −0.1211 | 6.7212 | 0.3296 | −0.2834 | 7.5267 | 0.3684 | −0.3588 | 8.3323 |
| 73 | 0.4336 | 0.2912 | 6.7212 | 0.5435 | −0.5097 | 7.5267 | 0.4555 | 0.0973 | 8.3323 |
| 74 | 0.2063 | 0.4727 | 6.7212 | 0.4656 | 0.185 | 7.5267 | 0.2527 | 0.3563 | 8.3323 |
| 75 | 0.333 | −0.2429 | 6.7212 | 0.2719 | 0.3908 | 7.5267 | 0.2307 | −0.2179 | 8.3323 |
| 76 | 0.1561 | 0.5009 | 6.7212 | 0.4138 | −0.3632 | 7.5267 | 0.4518 | −0.4607 | 8.3323 |
| 77 | 0.568 | −0.4627 | 6.7212 | 0.5858 | 0.0096 | 7.5267 | 0.5884 | −0.1363 | 8.3323 |
| 78 | 0.5675 | 0.1353 | 6.7212 | 0.3932 | 0.2722 | 7.5267 | 0.3772 | 0.2107 | 8.3323 |
| 79 | 0.3479 | 0.3709 | 6.7212 | 0.1832 | 0.4583 | 7.5267 | 0.1734 | 0.4297 | 8.3323 |
| 80 | 0.4259 | −0.3189 | 6.7212 | 0.2852 | −0.2463 | 7.5267 | 0.0819 | −0.1043 | 8.3323 |
| 81 | 0.2841 | −0.2082 | 6.7212 | 0.4923 | −0.4486 | 7.5267 | 0.3244 | −0.3099 | 8.3323 |
| 82 | 0.4739 | 0.2485 | 6.7212 | 0.5077 | 0.128 | 7.5267 | 0.5738 | −0.6275 | 8.3323 |
| 83 | 0.2548 | 0.4417 | 6.7212 | 0.3141 | 0.3531 | 7.5267 | 0.5023 | 0.0209 | 8.3323 |
| 84 | 1.0795 | −0.9325 | 6.7212 | 0.1374 | −0.1463 | 7.5267 | 0.2898 | 0.317 | 8.3323 |
| 85 | 0.7891 | −0.7435 | 6.7212 | 0.3725 | −0.3225 | 7.5267 | 0.0948 | 0.4893 | 8.3323 |
| 86 | 0.8312 | −0.3115 | 6.7212 | 0.1911 | −0.1786 | 7.5267 | 0.1806 | −0.1754 | 8.3323 |
| 87 | 1.0547 | −1.0798 | 6.7212 | 0.5929 | −0.5723 | 7.5267 | 0.4108 | −0.4092 | 8.3323 |
| 88 | 0.6106 | 0.0759 | 6.7212 | 0.957 | −1.0719 | 7.5267 | 0.4173 | 0.1548 | 8.3323 |
| 89 | 1.0965 | −1.1181 | 6.7212 | 0.6219 | −0.0513 | 7.5267 | 0.2139 | 0.394 | 8.3323 |
| 90 | 1.128 | −1.1008 | 6.7212 | 1.0589 | −1.1462 | 7.5267 | 0.9995 | −1.1718 | 8.3323 |
| 91 | 1.1193 | −1.0513 | 6.7212 | 1.0188 | −1.1509 | 7.5267 | 0.9609 | −1.0505 | 8.3323 |
| 92 | 0.988 | −0.681 | 6.7212 | 1.0584 | −1.1001 | 7.5267 | 0.738 | −0.4617 | 8.3323 |
| 93 | 0.7466 | −0.1453 | 6.7212 | 0.9722 | −0.8543 | 7.5267 | 0.8329 | −1.0105 | 8.3323 |
| 94 | 1.0714 | −1.0984 | 6.7212 | 0.6882 | −0.7001 | 7.5267 | 0.9435 | −1.182 | 8.3323 |
| 95 | 1.1101 | −1.1178 | 6.7212 | 0.7458 | −0.2913 | 7.5267 | 0.9818 | −1.194 | 8.3323 |
| 96 | 1.1292 | −1.0815 | 6.7212 | 0.9995 | −1.129 | 7.5267 | 0.9922 | −1.1364 | 8.3323 |
| 97 | 1.1032 | −1.0022 | 6.7212 | 1.0653 | −1.1297 | 7.5267 | 0.8756 | −0.8134 | 8.3323 |
| 98 | 0.7235 | −0.6552 | 6.7212 | 0.8819 | −0.6122 | 7.5267 | 0.6327 | −0.7126 | 8.3323 |
| 99 | 0.8868 | −0.4333 | 6.7212 | 0.874 | −0.959 | 7.5267 | 0.6664 | −0.2975 | 8.3323 |
| 100 | 1.0129 | −1.0317 | 6.7212 | 0.6656 | −0.1301 | 7.5267 | 0.8861 | −1.0922 | 8.3323 |
| 101 | 1.0903 | −1.1154 | 6.7212 | 1.0115 | −1.1443 | 7.5267 | 0.9996 | −1.1622 | 8.3323 |
| 102 | 0.6515 | 0.0151 | 6.7212 | 1.0525 | −1.1524 | 7.5267 | 0.9566 | −1.1934 | 8.3323 |
| 103 | 1.1233 | −1.1089 | 6.7212 | 0.6409 | −0.6359 | 7.5267 | 0.9961 | −1.1809 | 8.3323 |
| 104 | 0.6216 | −0.5254 | 6.7212 | 1.0618 | −1.1099 | 7.5267 | 0.9742 | −1.0874 | 8.3323 |
| 105 | 1.1227 | −1.0613 | 6.7212 | 1.0356 | −1.1575 | 7.5267 | 0.7855 | −0.5783 | 8.3323 |
| 106 | 1.0348 | −0.8064 | 6.7212 | 1.0152 | −0.9763 | 7.5267 | 0.8061 | −0.9698 | 8.3323 |
| 107 | 0.9661 | −0.9761 | 6.7212 | 0.783 | −0.3733 | 7.5267 | 0.9387 | −1.1746 | 8.3323 |
| 108 | 0.8544 | −0.8319 | 6.7212 | 0.9938 | −1.1212 | 7.5267 | 0.9734 | −1.1964 | 8.3323 |
| 109 | 0.7901 | −0.2278 | 6.7212 | 1.0271 | −1.1557 | 7.5267 | 0.9964 | −1.1492 | 8.3323 |
| 110 | 1.0629 | −1.0892 | 6.7212 | 1.0633 | −1.1384 | 7.5267 | 0.9189 | −0.9315 | 8.3323 |
| 111 | 1.1033 | −1.1189 | 6.7212 | 0.8338 | −0.4922 | 7.5267 | 0.7028 | −0.3793 | 8.3323 |
| 112 | 1.1301 | −1.0918 | 6.7212 | 1.0551 | −1.0904 | 7.5267 | 0.8596 | −1.0513 | 8.3323 |
| 113 | 1.1161 | −1.0413 | 6.7212 | 0.9278 | −0.733 | 7.5267 | 0.99 | −1.1886 | 8.3323 |
| 114 | 0.9209 | −0.9194 | 6.7212 | 1.0518 | −1.0809 | 7.5267 | 0.9878 | −1.124 | 8.3323 |

TABLE I-continued

| | | | | | | | | | |
|---|---|---|---|---|---|---|---|---|---|
| 115 | 0.6733 | −0.5897 | 6.7212 | 0.7812 | −0.8295 | 7.5267 | 0.8313 | −0.6956 | 8.3323 |
| 116 | 0.9389 | −0.5565 | 6.7212 | 0.7067 | −0.2102 | 7.5267 | 0.9494 | −1.1884 | 8.3323 |
| 117 | 0.7006 | −0.0642 | 6.7212 | 1.0053 | −1.1368 | 7.5267 | 0.7199 | −0.8408 | 8.3323 |
| 118 | 1.1166 | −1.1149 | 6.7212 | 1.0445 | −1.1563 | 7.5267 | 0.6283 | −0.2165 | 8.3323 |
| 119 | 1.0804 | −1.1074 | 6.7212 | 1.0645 | −1.1198 | 7.5267 | 0.9125 | −1.1333 | 8.3323 |
| 120 | 1.1263 | −1.0713 | 6.7212 | 1.0386 | −1.0435 | 7.5267 | 0.9648 | −1.1962 | 8.3323 |
| Hole 1 | −0.5479 | 0.1383 | 6.7212 | −0.5096 | 0.2053 | 7.5267 | −0.18 | 0.2314 | 8.3323 |
| Hole 2 | −0.2251 | 0.1797 | 6.7212 | −0.2026 | 0.2056 | 7.5267 | −0.4713 | 0.2723 | 8.3323 |
| Hole 3 | 0.4148 | −0.0903 | 6.7212 | 0.3993 | −0.1327 | 7.5267 | 0.3838 | −0.1752 | 8.3323 |
| Hole 4 | 0.1145 | 0.0659 | 6.7212 | 0.1236 | 0.0489 | 7.5267 | 0.1326 | 0.0319 | 8.3323 |
| Hole 5 | 0.7778 | −0.5172 | 6.7212 | 0.7455 | −0.5867 | 7.5267 | 0.7132 | −0.6561 | 8.3323 |

| | Section 7 | | | Section 8 | | | Section 9 | | |
|---|---|---|---|---|---|---|---|---|---|
| Point | X | Y | Z | X | Y | Z | X | Y | Z |
| 1 | −0.9264 | 0.1336 | 9.1378 | −0.8565 | 0.4588 | 9.9434 | −0.6547 | 0.4314 | 10.7489 |
| 2 | −0.9854 | 0.1605 | 9.1378 | −0.5619 | 0.6317 | 9.9434 | −0.5888 | 0.7092 | 10.7489 |
| 3 | −0.7311 | 0.1622 | 9.1378 | −0.675 | 0.5858 | 9.9434 | −0.8107 | 0.4492 | 10.7489 |
| 4 | −0.6348 | 0.5555 | 9.1378 | −0.7539 | 0.2871 | 9.9434 | −0.7585 | 0.6433 | 10.7489 |
| 5 | −0.8293 | 0.4179 | 9.1378 | −0.9004 | 0.2828 | 9.9434 | −0.8868 | 0.4674 | 10.7489 |
| 6 | −0.9569 | 0.267 | 9.1378 | −0.946 | 0.3286 | 9.9434 | −0.8708 | 0.5568 | 10.7489 |
| 7 | −0.9604 | 0.1375 | 9.1378 | −0.9427 | 0.3014 | 9.9434 | −0.9023 | 0.5093 | 10.7489 |
| 8 | −0.8709 | 0.1391 | 9.1378 | −0.9159 | 0.3908 | 9.9434 | −0.8995 | 0.4782 | 10.7489 |
| 9 | −0.6287 | 0.1735 | 9.1378 | −0.7871 | 0.5171 | 9.9434 | −0.9035 | 0.4856 | 10.7489 |
| 10 | −0.5199 | 0.6052 | 9.1378 | −0.6004 | 0.6185 | 9.9434 | −0.661 | 0.6882 | 10.7489 |
| 11 | −0.9813 | 0.1523 | 9.1378 | −0.5956 | 0.289 | 9.9434 | −0.855 | 0.4565 | 10.7489 |
| 12 | −0.7175 | 0.5058 | 9.1378 | −0.8441 | 0.2822 | 9.9434 | −0.8136 | 0.6075 | 10.7489 |
| 13 | −0.8933 | 0.3526 | 9.1378 | −0.9226 | 0.2871 | 9.9434 | −0.8913 | 0.5303 | 10.7489 |
| 14 | −0.9776 | 0.2261 | 9.1378 | −0.9402 | 0.3477 | 9.9434 | −0.9051 | 0.4937 | 10.7489 |
| 15 | −0.9434 | 0.1343 | 9.1378 | −0.6409 | 0.2902 | 9.9434 | −0.6105 | 0.4245 | 10.7489 |
| 16 | −0.9877 | 0.1694 | 9.1378 | −0.8777 | 0.4373 | 9.9434 | −0.5502 | 0.7167 | 10.7489 |
| 17 | −0.782 | 0.1542 | 9.1378 | −0.711 | 0.5665 | 9.9434 | −0.7884 | 0.4466 | 10.7489 |
| 18 | −0.5256 | 0.1759 | 9.1378 | −0.6861 | 0.2898 | 9.9434 | −0.7269 | 0.6602 | 10.7489 |
| 19 | −0.5914 | 0.5768 | 9.1378 | −0.8892 | 0.282 | 9.9434 | −0.8765 | 0.4628 | 10.7489 |
| 20 | −0.7948 | 0.4479 | 9.1378 | −0.9471 | 0.3187 | 9.9434 | −0.8591 | 0.5689 | 10.7489 |
| 21 | −0.9404 | 0.2927 | 9.1378 | −0.9372 | 0.295 | 9.9434 | −0.8991 | 0.5165 | 10.7489 |
| 22 | −0.9683 | 0.1409 | 9.1378 | −0.9267 | 0.3742 | 9.9434 | −0.5665 | 0.4161 | 10.7489 |
| 23 | −0.9866 | 0.1969 | 9.1378 | −0.8228 | 0.489 | 9.9434 | −0.627 | 0.6993 | 10.7489 |
| 24 | −0.9093 | 0.1345 | 9.1378 | −0.6381 | 0.6031 | 9.9434 | −0.8329 | 0.4524 | 10.7489 |
| 25 | −0.68 | 0.1688 | 9.1378 | −0.5504 | 0.2861 | 9.9434 | −0.789 | 0.6246 | 10.7489 |
| 26 | −0.6768 | 0.5317 | 9.1378 | −0.8215 | 0.2832 | 9.9434 | −0.8816 | 0.544 | 10.7489 |
| 27 | −0.8622 | 0.3861 | 9.1378 | −0.9116 | 0.2844 | 9.9434 | −0.9044 | 0.5018 | 10.7489 |
| 28 | −0.9714 | 0.2401 | 9.1378 | −0.9435 | 0.3382 | 9.9434 | −0.8938 | 0.4721 | 10.7489 |
| 29 | −0.988 | 0.1878 | 9.1378 | −0.946 | 0.3088 | 9.9434 | −0.7215 | 0.4396 | 10.7489 |
| 30 | −0.952 | 0.1355 | 9.1378 | −0.8976 | 0.4147 | 9.9434 | −0.6943 | 0.6751 | 10.7489 |
| 31 | −0.9884 | 0.1786 | 9.1378 | −0.7498 | 0.543 | 9.9434 | −0.8658 | 0.4592 | 10.7489 |
| 32 | −0.8328 | 0.1454 | 9.1378 | −0.8666 | 0.2817 | 9.9434 | −0.837 | 0.589 | 10.7489 |
| 33 | −0.5771 | 0.1759 | 9.1378 | −0.9304 | 0.2903 | 9.9434 | −0.8954 | 0.5235 | 10.7489 |
| 34 | −0.556 | 0.5919 | 9.1378 | −0.9361 | 0.3569 | 9.9434 | 0.0006 | 0.5009 | 10.7489 |
| 35 | −0.7569 | 0.4778 | 9.1378 | −0.0697 | 0.0944 | 9.9434 | −0.2626 | 0.2926 | 10.7489 |
| 36 | −0.9224 | 0.3173 | 9.1378 | −0.2807 | 0.2208 | 9.9434 | −0.1441 | 0.6273 | 10.7489 |
| 37 | −0.9755 | 0.1458 | 9.1378 | −0.5054 | 0.2812 | 9.9434 | −0.0741 | 0.1363 | 10.7489 |
| 38 | −0.9827 | 0.2117 | 9.1378 | −0.4838 | 0.6511 | 9.9434 | −0.3066 | 0.7033 | 10.7489 |
| 39 | −0.2522 | 0.6356 | 9.1378 | −0.2899 | 0.6556 | 9.9434 | −0.4718 | 0.7241 | 10.7489 |
| 40 | −0.4457 | 0.6258 | 9.1378 | −0.1117 | 0.5972 | 9.9434 | −0.3956 | 0.3629 | 10.7489 |
| 41 | −0.4741 | 0.1733 | 9.1378 | 0.0428 | −0.0072 | 9.9434 | −0.0543 | 0.5561 | 10.7489 |
| 42 | −0.2295 | 0.1207 | 9.1378 | 0.0461 | 0.4817 | 9.9434 | −0.1813 | 0.2339 | 10.7489 |
| 43 | −0.0071 | 0.0027 | 9.1378 | −0.1521 | 0.1529 | 9.9434 | −0.2073 | 0.6644 | 10.7489 |
| 44 | 0.0503 | 0.5047 | 9.1378 | −0.3703 | 0.2529 | 9.9434 | −0.4798 | 0.3936 | 10.7489 |
| 45 | −0.1345 | 0.6081 | 9.1378 | −0.4048 | 0.6607 | 9.9434 | −0.0102 | 0.0662 | 10.7489 |
| 46 | −0.331 | 0.6394 | 9.1378 | −0.2163 | 0.6395 | 9.9434 | −0.3719 | 0.7176 | 10.7489 |
| 47 | −0.3721 | 0.1602 | 9.1378 | −0.0458 | 0.5572 | 9.9434 | 0.0264 | 0.4717 | 10.7489 |
| 48 | −0.1386 | 0.0815 | 9.1378 | −0.0307 | 0.0622 | 9.9434 | −0.3055 | 0.3185 | 10.7489 |
| 49 | 0.0783 | −0.0645 | 9.1378 | −0.2375 | 0.201 | 9.9434 | −0.1142 | 0.6061 | 10.7489 |
| 50 | −0.022 | 0.5546 | 9.1378 | −0.4606 | 0.2743 | 9.9434 | −0.1079 | 0.1696 | 10.7489 |
| 51 | −0.2123 | 0.6294 | 9.1378 | −0.5228 | 0.6427 | 9.9434 | −0.2747 | 0.6932 | 10.7489 |
| 52 | −0.4078 | 0.6328 | 9.1378 | −0.3274 | 0.6599 | 9.9434 | 0.0616 | −0.0235 | 10.7489 |
| 53 | −0.2763 | 0.1366 | 9.1378 | −0.1456 | 0.6136 | 9.9434 | −0.4384 | 0.7239 | 10.7489 |
| 54 | −0.0523 | 0.033 | 9.1378 | 0.0167 | 0.5085 | 9.9434 | −0.4373 | 0.3793 | 10.7489 |
| 55 | 0.0842 | 0.4767 | 9.1378 | −0.1102 | 0.1247 | 9.9434 | −0.0263 | 0.529 | 10.7489 |
| 56 | −0.097 | 0.5933 | 9.1378 | −0.4164 | 0.2651 | 9.9434 | −0.2212 | 0.2643 | 10.7489 |
| 57 | −0.2924 | 0.6389 | 9.1378 | −0.2528 | 0.6488 | 9.9434 | −0.1752 | 0.6468 | 10.7489 |
| 58 | −0.4831 | 0.6166 | 9.1378 | −0.325 | 0.2382 | 9.9434 | −0.0416 | 0.1017 | 10.7489 |
| 59 | −0.4229 | 0.1682 | 9.1378 | −0.4444 | 0.6571 | 9.9434 | −0.3391 | 0.7114 | 10.7489 |
| 60 | −0.1835 | 0.1023 | 9.1378 | −0.0789 | 0.5787 | 9.9434 | −0.5111 | 0.7217 | 10.7489 |
| 61 | 0.0364 | −0.0298 | 9.1378 | 0.0068 | 0.0283 | 9.9434 | 0.0512 | 0.4417 | 10.7489 |
| 62 | 0.0149 | 0.5307 | 9.1378 | −0.1955 | 0.1788 | 9.9434 | −0.3499 | 0.342 | 10.7489 |
| 63 | −0.173 | 0.6202 | 9.1378 | −0.3651 | 0.6615 | 9.9434 | −0.0836 | 0.5818 | 10.7489 |
| 64 | −0.3696 | 0.6374 | 9.1378 | −0.1806 | 0.6277 | 9.9434 | −0.1428 | 0.2016 | 10.7489 |

TABLE I-continued

| | | | | | | | | | |
|---|---|---|---|---|---|---|---|---|---|
| 65 | −0.3239 | 0.1498 | 9.1378 | −0.0139 | 0.5337 | 9.9434 | −0.2405 | 0.6799 | 10.7489 |
| 66 | −0.0948 | 0.0584 | 9.1378 | 0.1338 | 0.386 | 9.9434 | −0.5229 | 0.4058 | 10.7489 |
| 67 | −0.0605 | 0.576 | 9.1378 | 0.4935 | −0.2518 | 9.9434 | 0.0201 | 0.0298 | 10.7489 |
| 68 | 0.3243 | −0.3366 | 9.1378 | 0.4529 | −0.5959 | 9.9434 | −0.4051 | 0.7218 | 10.7489 |
| 69 | 0.5626 | −0.6994 | 9.1378 | 0.2308 | −0.2382 | 9.9434 | 0.3255 | −0.0116 | 10.7489 |
| 70 | 0.5815 | −0.2938 | 9.1378 | 0.25 | 0.2203 | 9.9434 | 0.1531 | 0.2994 | 10.7489 |
| 71 | 0.3869 | 0.0883 | 9.1378 | 0.5896 | −0.4744 | 9.9434 | 0.2123 | −0.2477 | 10.7489 |
| 72 | 0.2168 | 0.3377 | 9.1378 | 0.4428 | −0.1417 | 9.9434 | 0.4555 | −0.687 | 10.7489 |
| 73 | 0.1167 | 0.447 | 9.1378 | 0.3293 | −0.3873 | 9.9434 | 0.458 | −0.3011 | 10.7489 |
| 74 | 0.202 | −0.1863 | 9.1378 | 0.1599 | −0.1423 | 9.9434 | 0.2575 | 0.1206 | 10.7489 |
| 75 | 0.3991 | −0.4422 | 9.1378 | 0.1011 | 0.4245 | 9.9434 | 0.0869 | 0.3954 | 10.7489 |
| 76 | 0.4931 | −0.1086 | 9.1378 | 0.3898 | −0.0326 | 9.9434 | 0.3019 | −0.4002 | 10.7489 |
| 77 | 0.3233 | 0.191 | 9.1378 | 0.5119 | −0.7018 | 9.9434 | 0.5614 | −0.8989 | 10.7489 |
| 78 | 0.1478 | 0.416 | 9.1378 | 0.1945 | 0.305 | 9.9434 | 0.5883 | −0.6229 | 10.7489 |
| 79 | 0.2851 | −0.2853 | 9.1378 | 0.2645 | −0.2873 | 9.9434 | 0.3714 | −0.1073 | 10.7489 |
| 80 | 0.5094 | −0.6128 | 9.1378 | 0.1649 | 0.346 | 9.9434 | 0.1841 | 0.2499 | 10.7489 |
| 81 | 0.4169 | 0.0357 | 9.1378 | 0.3157 | 0.108 | 9.9434 | 0.1764 | −0.1905 | 10.7489 |
| 82 | 0.254 | 0.2901 | 9.1378 | 0.3535 | 0.0381 | 9.9434 | 0.4009 | −0.5819 | 10.7489 |
| 83 | 0.1576 | −0.1392 | 9.1378 | 0.5697 | −0.8084 | 9.9434 | 0.4992 | −0.3989 | 10.7489 |
| 84 | 0.3622 | −0.389 | 9.1378 | 0.5424 | −0.3627 | 9.9434 | 0.2921 | 0.0548 | 10.7489 |
| 85 | 0.5382 | −0.2008 | 9.1378 | 0.3922 | −0.491 | 9.9434 | 0.1208 | 0.348 | 10.7489 |
| 86 | 0.3558 | 0.1401 | 9.1378 | 0.0835 | −0.0507 | 9.9434 | 0.2578 | −0.3236 | 10.7489 |
| 87 | 0.1777 | 0.3837 | 9.1378 | 0.196 | −0.1898 | 9.9434 | 0.5089 | −0.7927 | 10.7489 |
| 88 | 0.2444 | −0.2351 | 9.1378 | 0.0742 | 0.4537 | 9.9434 | 0.1013 | −0.0781 | 10.7489 |
| 89 | 0.4551 | −0.5269 | 9.1378 | 0.2228 | 0.263 | 9.9434 | 0.4154 | −0.2039 | 10.7489 |
| 90 | 0.4459 | −0.0174 | 9.1378 | 0.2973 | −0.337 | 9.9434 | 0.2216 | 0.1858 | 10.7489 |
| 91 | 0.2895 | 0.2411 | 9.1378 | 0.1225 | −0.0958 | 9.9434 | 0.1395 | −0.1339 | 10.7489 |
| 92 | 0.1187 | −0.101 | 9.1378 | 0.2762 | 0.1769 | 9.9434 | 0.3448 | −0.4775 | 10.7489 |
| 93 | 0.7775 | −0.7689 | 9.1378 | 0.7838 | −1.2108 | 9.9434 | 0.5392 | −0.4971 | 10.7489 |
| 94 | 0.898 | −1.2423 | 9.1378 | 0.818 | −1.2734 | 9.9434 | 0.7649 | −1.3145 | 10.7489 |
| 95 | 0.8703 | −1.2172 | 9.1378 | 0.7205 | −0.809 | 9.9434 | 0.8002 | −1.3298 | 10.7489 |
| 96 | 0.9167 | −1.2391 | 9.1378 | 0.8611 | −1.2165 | 9.9434 | 0.8188 | −1.3044 | 10.7489 |
| 97 | 0.9314 | −1.2067 | 9.1378 | 0.8713 | −1.2698 | 9.9434 | 0.8073 | −1.259 | 10.7489 |
| 98 | 0.8826 | −1.0597 | 9.1378 | 0.7573 | −1.1615 | 9.9434 | 0.6814 | −0.8765 | 10.7489 |
| 99 | 0.7024 | −0.5769 | 9.1378 | 0.8233 | −1.2801 | 9.9434 | 0.7386 | −1.2618 | 10.7489 |
| 100 | 0.7484 | −1.0111 | 9.1378 | 0.8009 | −1.2421 | 9.9434 | 0.7761 | −1.327 | 10.7489 |
| 101 | 0.8814 | −1.2331 | 9.1378 | 0.6266 | −0.9155 | 9.9434 | 0.81 | −1.324 | 10.7489 |
| 102 | 0.9297 | −1.2252 | 9.1378 | 0.8005 | −1.0332 | 9.9434 | 0.8155 | −1.2858 | 10.7489 |
| 103 | 0.9244 | −1.1813 | 9.1378 | 0.8616 | −1.2833 | 9.9434 | 0.7913 | −1.2078 | 10.7489 |
| 104 | 0.8135 | −0.8654 | 9.1378 | 0.6785 | −0.6976 | 9.9434 | 0.7608 | −1.3071 | 10.7489 |
| 105 | 0.6232 | −0.3876 | 9.1378 | 0.8571 | −1.2045 | 9.9434 | 0.792 | −1.3313 | 10.7489 |
| 106 | 0.8557 | −1.1922 | 9.1378 | 0.8375 | −1.2886 | 9.9434 | 0.8175 | −1.3125 | 10.7489 |
| 107 | 0.9076 | −1.2422 | 9.1378 | 0.8459 | −1.2892 | 9.9434 | 0.8101 | −1.2679 | 10.7489 |
| 108 | 0.916 | −1.157 | 9.1378 | 0.8726 | −1.2617 | 9.9434 | 0.7253 | −1.0042 | 10.7489 |
| 109 | 0.7405 | −0.6727 | 9.1378 | 0.7102 | −1.0733 | 9.9434 | 0.6794 | −1.1409 | 10.7489 |
| 110 | 0.6559 | −0.855 | 9.1378 | 0.7612 | −0.9209 | 9.9434 | 0.7699 | −1.3214 | 10.7489 |
| 111 | 0.8753 | −1.2256 | 9.1378 | 0.865 | −1.2285 | 9.9434 | 0.8054 | −1.3274 | 10.7489 |
| 112 | 0.9244 | −1.2331 | 9.1378 | 0.8675 | −1.2772 | 9.9434 | 0.8178 | −1.2951 | 10.7489 |
| 113 | 0.9282 | −1.1938 | 9.1378 | 0.8299 | −1.2854 | 9.9434 | 0.8045 | −1.25 | 10.7489 |
| 114 | 0.6635 | −0.4819 | 9.1378 | 0.8718 | −1.2533 | 9.9434 | 0.6357 | −0.7494 | 10.7489 |
| 115 | 0.8487 | −0.9622 | 9.1378 | 0.7923 | −1.2265 | 9.9434 | 0.7499 | −1.2844 | 10.7489 |
| 116 | 0.8408 | −1.1673 | 9.1378 | 0.6352 | −0.5867 | 9.9434 | 0.7836 | −1.3305 | 10.7489 |
| 117 | 0.9321 | −1.213 | 9.1378 | 0.8093 | −1.2578 | 9.9434 | 0.8138 | −1.3198 | 10.7489 |
| 118 | 0.889 | −1.239 | 9.1378 | 0.8291 | −1.1188 | 9.9434 | 0.8129 | −1.2768 | 10.7489 |
| 119 | 0.9316 | −1.2193 | 9.1378 | 0.8541 | −1.2874 | 9.9434 | 0.7675 | −1.1325 | 10.7489 |
| 120 | 0.9203 | −1.169 | 9.1378 | 0.8687 | −1.2408 | 9.9434 | 0.6205 | −1.0199 | 10.7489 |
| Hole 1 | −0.1575 | 0.2573 | 9.1378 | −0.1349 | 0.2832 | 9.9434 | −0.1124 | 0.3091 | 10.7489 |
| Hole 2 | −0.4329 | 0.3392 | 9.1378 | −0.3946 | 0.4062 | 9.9434 | −0.3563 | 0.4732 | 10.7489 |
| Hole 3 | 0.3684 | −0.2177 | 9.1378 | 0.3529 | −0.2601 | 9.9434 | 0.3374 | −0.3026 | 10.7489 |
| Hole 4 | 0.1416 | 0.015 | 9.1378 | 0.1506 | −0.002 | 9.9434 | 0.1596 | −0.019 | 10.7489 |
| Hole 5 | 0.6809 | −0.7256 | 9.1378 | 0.6486 | −0.795 | 9.9434 | 0.6163 | −0.8645 | 10.7489 |

| | Section 10 | | |
|---|---|---|---|
| Point | X | Y | Z |
| 1 | −0.8551 | 0.6867 | 11.5545 |
| 2 | −0.6417 | 0.8365 | 11.5545 |
| 3 | −0.8138 | 0.6581 | 11.5545 |
| 4 | −0.7705 | 0.7968 | 11.5545 |
| 5 | −0.8241 | 0.6627 | 11.5545 |
| 6 | −0.843 | 0.7436 | 11.5545 |
| 7 | −0.8601 | 0.7104 | 11.5545 |
| 8 | −0.8435 | 0.6743 | 11.5545 |
| 9 | −0.5776 | 0.5807 | 11.5545 |
| 10 | −0.5519 | 0.8422 | 11.5545 |
| 11 | −0.6627 | 0.6108 | 11.5545 |
| 12 | −0.7003 | 0.8236 | 11.5545 |
| 13 | −0.8094 | 0.7738 | 11.5545 |
| 14 | −0.7494 | 0.6365 | 11.5545 |

TABLE I-continued

| | | | |
|---|---|---|---|
| 15 | −0.8518 | 0.7312 | 11.5545 |
| 16 | −0.8588 | 0.6945 | 11.5545 |
| 17 | −0.6119 | 0.8402 | 11.5545 |
| 18 | −0.75 | 0.8062 | 11.5545 |
| 19 | −0.8328 | 0.7548 | 11.5545 |
| 20 | −0.8583 | 0.7177 | 11.5545 |
| 21 | −0.834 | 0.6681 | 11.5545 |
| 22 | −0.5361 | 0.563 | 11.5545 |
| 23 | −0.8498 | 0.6799 | 11.5545 |
| 24 | −0.6199 | 0.5965 | 11.5545 |
| 25 | −0.6712 | 0.831 | 11.5545 |
| 26 | −0.7904 | 0.786 | 11.5545 |
| 27 | −0.706 | 0.624 | 11.5545 |
| 28 | −0.8605 | 0.7026 | 11.5545 |
| 29 | −0.7711 | 0.643 | 11.5545 |
| 30 | −0.7926 | 0.6501 | 11.5545 |
| 31 | −0.5819 | 0.8421 | 11.5545 |
| 32 | −0.7289 | 0.8144 | 11.5545 |
| 33 | −0.8215 | 0.7648 | 11.5545 |
| 34 | −0.8554 | 0.7246 | 11.5545 |
| 35 | −0.8477 | 0.7375 | 11.5545 |
| 36 | −0.4889 | 0.8369 | 11.5545 |
| 37 | −0.4175 | 0.4985 | 11.5545 |
| 38 | −0.1576 | 0.2676 | 11.5545 |
| 39 | 0.0226 | 0.4372 | 11.5545 |
| 40 | −0.4956 | 0.5434 | 11.5545 |
| 41 | 0.0335 | 0.0037 | 11.5545 |
| 42 | −0.1127 | 0.6179 | 11.5545 |
| 43 | −0.226 | 0.3422 | 11.5545 |
| 44 | −0.2472 | 0.7394 | 11.5545 |
| 45 | −0.3966 | 0.815 | 11.5545 |
| 46 | −0.0831 | 0.1741 | 11.5545 |
| 47 | −0.0308 | 0.515 | 11.5545 |
| 48 | −0.3 | 0.4113 | 11.5545 |
| 49 | −0.3044 | 0.7748 | 11.5545 |
| 50 | −0.4577 | 0.8314 | 11.5545 |
| 51 | −0.164 | 0.6712 | 11.5545 |
| 52 | −0.38 | 0.4734 | 11.5545 |
| 53 | −0.1911 | 0.3056 | 11.5545 |
| 54 | 0.0482 | 0.3975 | 11.5545 |
| 55 | −0.456 | 0.5219 | 11.5545 |
| 56 | −0.014 | 0.0765 | 11.5545 |
| 57 | −0.0885 | 0.5897 | 11.5545 |
| 58 | −0.22 | 0.7194 | 11.5545 |
| 59 | −0.3651 | 0.8035 | 11.5545 |
| 60 | −0.5203 | 0.8405 | 11.5545 |
| 61 | −0.1196 | 0.2215 | 11.5545 |
| 62 | −0.0036 | 0.4764 | 11.5545 |
| 63 | −0.1378 | 0.6451 | 11.5545 |
| 64 | −0.2753 | 0.7579 | 11.5545 |
| 65 | −0.4269 | 0.8241 | 11.5545 |
| 66 | −0.2623 | 0.3775 | 11.5545 |
| 67 | −0.048 | 0.1257 | 11.5545 |
| 68 | −0.059 | 0.5528 | 11.5545 |
| 69 | −0.1914 | 0.696 | 11.5545 |
| 70 | −0.3393 | 0.4433 | 11.5545 |
| 71 | −0.3343 | 0.7901 | 11.5545 |
| 72 | 0.4329 | −0.3671 | 11.5545 |
| 73 | 0.2249 | 0.0873 | 11.5545 |
| 74 | 0.2483 | −0.3739 | 11.5545 |
| 75 | 0.4973 | −0.8811 | 11.5545 |
| 76 | 0.5585 | −0.6944 | 11.5545 |
| 77 | 0.3485 | −0.1702 | 11.5545 |
| 78 | 0.14 | 0.2444 | 11.5545 |
| 79 | 0.1231 | −0.1452 | 11.5545 |
| 80 | 0.342 | −0.5579 | 11.5545 |
| 81 | 0.4728 | −0.4665 | 11.5545 |
| 82 | 0.265 | 0.0075 | 11.5545 |
| 83 | 0.2075 | −0.2972 | 11.5545 |
| 84 | 0.4463 | −0.773 | 11.5545 |
| 85 | 0.3915 | −0.2683 | 11.5545 |
| 86 | 0.1832 | 0.1663 | 11.5545 |
| 87 | 0.079 | −0.0703 | 11.5545 |
| 88 | 0.2883 | −0.4511 | 11.5545 |
| 89 | 0.5615 | −1.0191 | 11.5545 |
| 90 | 0.5113 | −0.5665 | 11.5545 |
| 91 | 0.3038 | −0.0729 | 11.5545 |
| 92 | 0.095 | 0.3215 | 11.5545 |
| 93 | 0.1658 | −0.2209 | 11.5545 |
| 94 | 0.3946 | −0.6652 | 11.5545 |

TABLE I-continued

| | | | |
|---|---|---|---|
| 95 | 0.6812 | −1.2788 | 11.5545 |
| 96 | 0.718 | −1.3559 | 11.5545 |
| 97 | 0.749 | −1.3652 | 11.5545 |
| 98 | 0.7661 | −1.3342 | 11.5545 |
| 99 | 0.7473 | −1.2692 | 11.5545 |
| 100 | 0.7083 | −1.3385 | 11.5545 |
| 101 | 0.7278 | −1.3644 | 11.5545 |
| 102 | 0.7614 | −1.3562 | 11.5545 |
| 103 | 0.762 | −1.3175 | 11.5545 |
| 104 | 0.6895 | −1.0818 | 11.5545 |
| 105 | 0.6251 | −1.1572 | 11.5545 |
| 106 | 0.7144 | −1.3503 | 11.5545 |
| 107 | 0.7417 | −1.3667 | 11.5545 |
| 108 | 0.7665 | −1.3427 | 11.5545 |
| 109 | 0.757 | −1.3012 | 11.5545 |
| 110 | 0.6038 | −0.823 | 11.5545 |
| 111 | 0.7055 | −1.3325 | 11.5545 |
| 112 | 0.7224 | −1.3607 | 11.5545 |
| 113 | 0.7559 | −1.3615 | 11.5545 |
| 114 | 0.7643 | −1.3257 | 11.5545 |
| 115 | 0.73 | −1.212 | 11.5545 |
| 116 | 0.7112 | −1.3444 | 11.5545 |
| 117 | 0.7341 | −1.3664 | 11.5545 |
| 118 | 0.765 | −1.3498 | 11.5545 |
| 119 | 0.7595 | −1.3093 | 11.5545 |
| 120 | 0.6475 | −0.9521 | 11.5545 |
| Hole 1 | −0.3179 | 0.5402 | 11.5545 |
| Hole 2 | −0.0898 | 0.335 | 11.5545 |
| Hole 3 | 0.3219 | −0.345 | 11.5545 |
| Hole 4 | 0.1687 | −0.0359 | 11.5545 |
| Hole 5 | 0.584 | −0.934 | 11.5545 |

FIG. 5 is an illustration of cross-sections of turbine bucket 22. As shown in FIG. 2, bucket 22 includes a plurality of cooling fluid medium passages 100, which may also be referred to as cooling passages. In an exemplary embodiment, the cooling fluid medium is air. Alternatively, any cooling fluid medium may be used that facilitates cooling of turbine bucket 22 as described herein. In the exemplary embodiment, the plurality of cooling passages 100 include a first cooling passage 102, a second cooling passage 104, a third cooling passage 106, a fourth cooling passage 108, and a fifth cooling passage 110. To enhance the cooling of airfoil 40, passages 100 extend through airfoil 40 from a root portion 120 of airfoil 40 to a tip portion 122 of airfoil 40. The passages 100 extend substantially linearly through the compound curved airfoil 40 and continue through platform 42, shank section 44, and dovetail section 46.

In the exemplary embodiment, a cooling medium, for example, air, may be provided to the plurality of cooling passages 100 that extend through airfoil 40. Wheel 16, on which the bucket 22 is mounted, includes a single plenum which opens into cooling passages 100 when dovetail 46 is secured to wheel 16. Consequently, as wheel 16 rotates, cooling medium is supplied from the single plenum in wheel 16 to cooling passages 100 for flow radially outwardly through passages 100 prior to being discharged through cooling hole exit locations defined in the tip portion 122 of airfoil 40.

Turbines are designed to operate at a predetermined temperature that provides a desired performance and efficiency. Typically, newer turbines are designed to operate at a higher temperature than older turbines and newer turbine components are designed to withstand the higher temperatures. To withstand higher temperatures, the shape of an airfoil may be changed and/or the material the bucket is constructed from may be changed. In another example, buckets are provided with larger cooling passages to maintain suitable temperatures throughout the airfoil. However, diverting a larger amount of air from the compressor and into the cooling passages may lower the efficiency of the turbine. Changing the amount of air diverted from the compressor and into the cooling passages may also trigger government regulatory requirements and force a turbine operator to fulfill reporting requirements and/or take other actions. Therefore, when replacing worn or damaged buckets, it is not always necessary or beneficial to replace the bucket with a bucket designed for use in a new, higher temperature turbine. When replacing a worn or damaged bucket, it is beneficial to maintain the supply conditions, bucket life expectancy, and the repair strategy of the original bucket. This includes maintaining a substantially similar level of blade cooling as was previously present. However, it is also beneficial for a replacement bucket to have a modified shape and material if that shape and material improves performance of the turbine.

Figure 6:
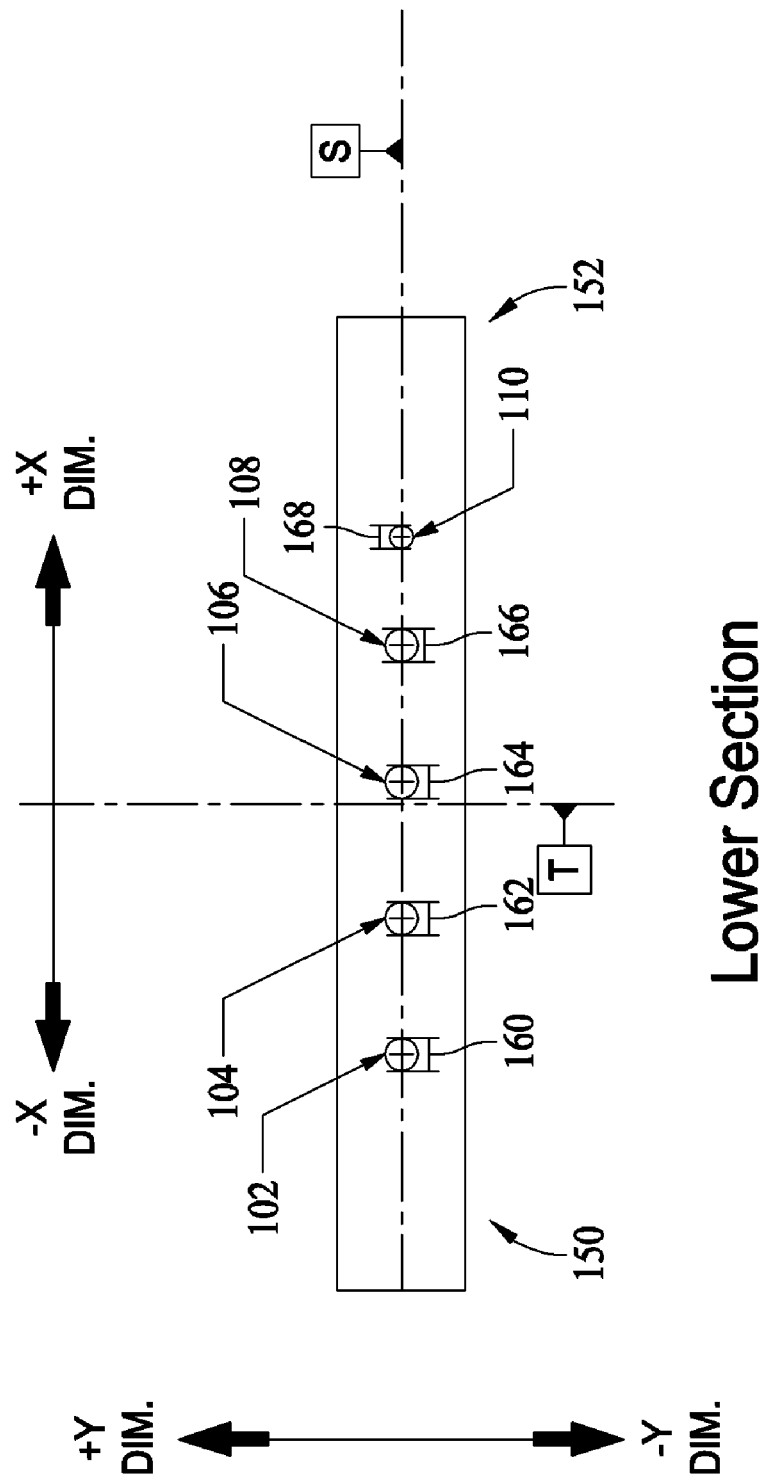
FIG. 6 is a cross-sectional view of the turbine bucket shown in FIG. 2 taken along line 1-1.
Figure 7:
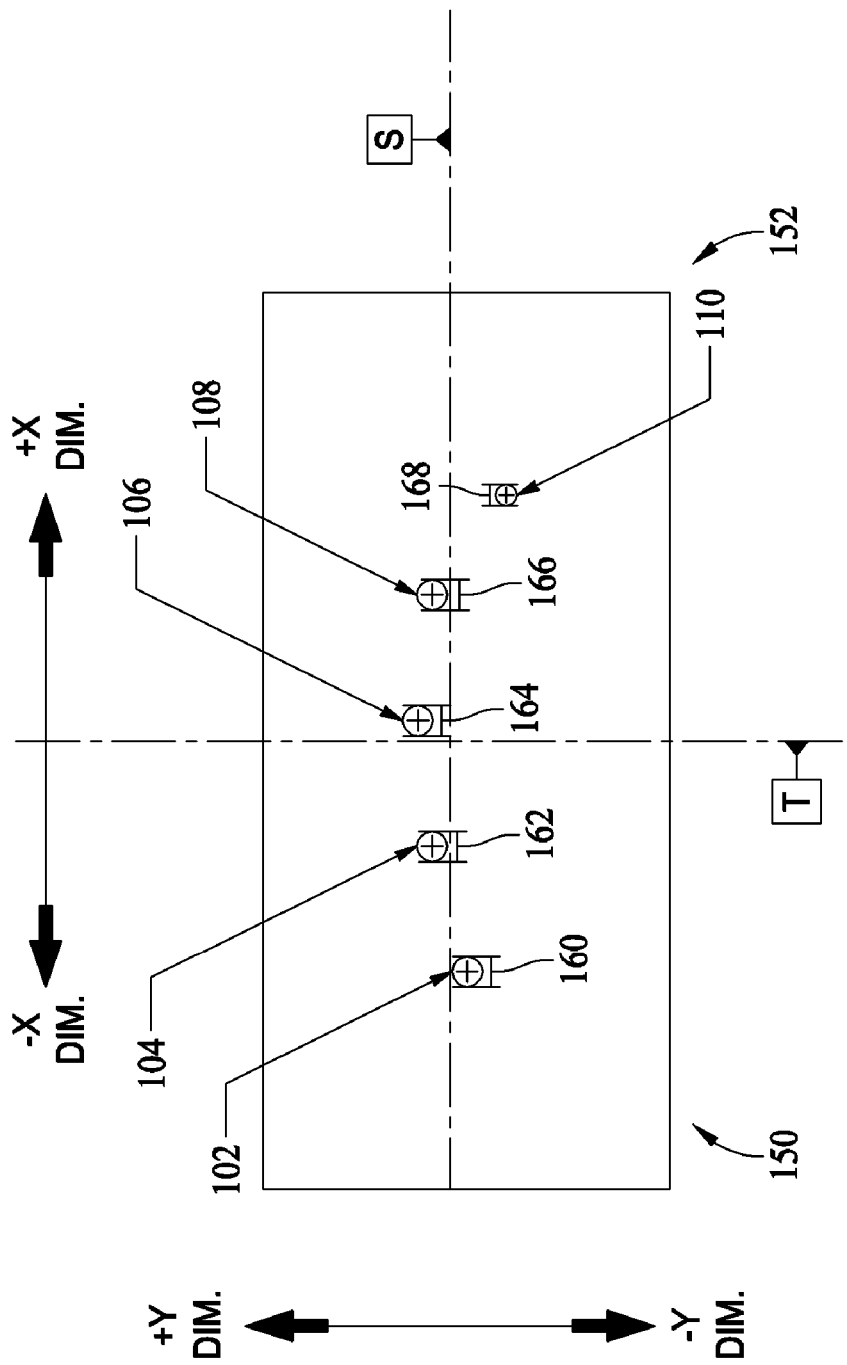
FIG. 7 is a cross-sectional view of the turbine bucket shown in FIG. 2 and taken along line 2-2.
Figure 8:
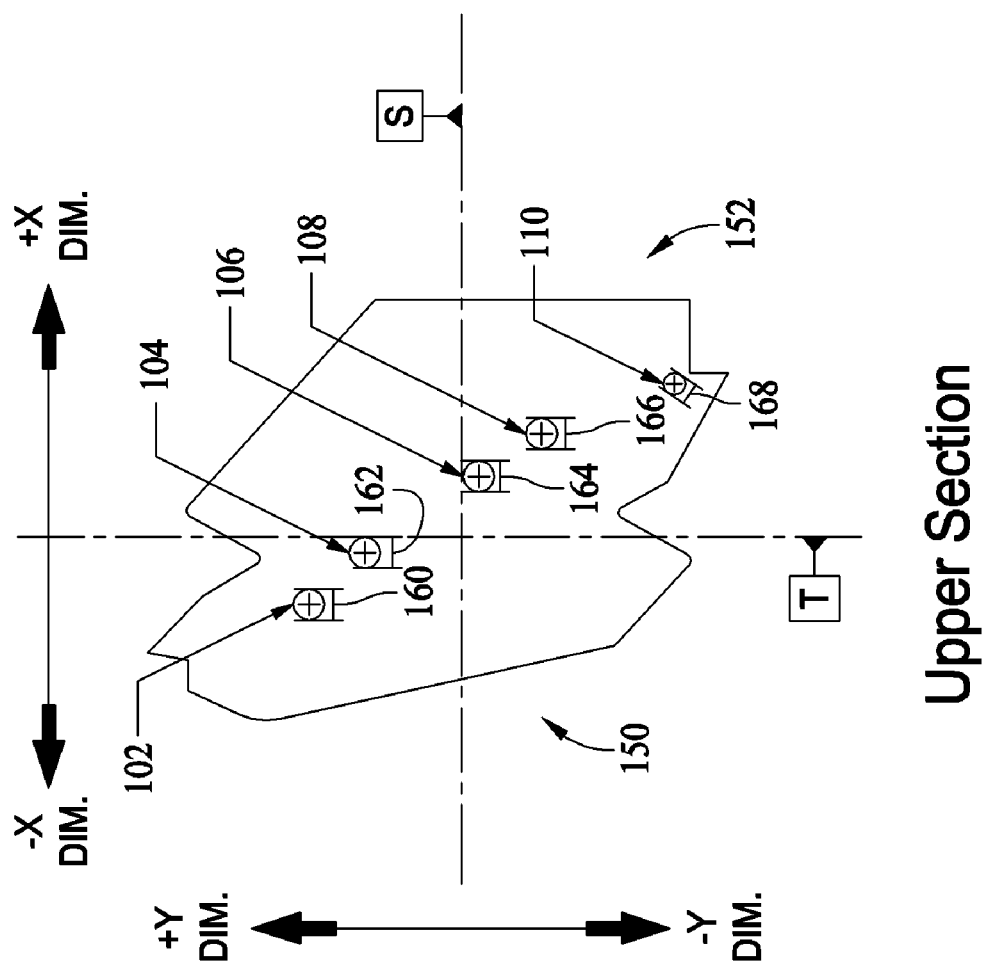
FIG. 8 is a cross-sectional view of the turbine bucket shown in FIG. 2 and taken along line 3-3.

As described above, FIG. 2 is a front cross-sectional view of turbine bucket 22 and illustrates an exemplary orientation of cooling passages 100. FIG. 6 is a cross-sectional view of airfoil 40 taken along line 1-1 (shown in FIG. 2). FIG. 7 is a cross-sectional view of airfoil 40 taken along line 2-2 (shown in FIG. 2). FIG. 8 is a cross-sectional view of airfoil 40 taken along line 3-3 (shown in FIG. 2). The exemplary orientation of cooling passages 100 facilitates airfoil 40 maintaining and/or improving turbine performance and bucket life.

To facilitate the replacement of an original four-hole stage 2 bucket, with bucket 22 described herein, air passages 100 in the exemplary embodiment extend in a camber line pattern 140 (shown in FIG. 5) of airfoil 40. More specifically, in the exemplary embodiment, the camber line pattern 140 extends generally along a mean camber line 142 (shown in FIG. 5) of airfoil 40. Mean camber line 142 is equidistant at all points between a suction side surface 144 (shown in FIG. 5) and a pressure side surface 146 (shown in FIG. 5) of airfoil 40. In the exemplary embodiment, a distance between edges of air passages 100 and either suction side surface 144 and/or pressure side surface 146 of airfoil 40 is no less than about 0.050 inches. Alternatively, the locations of air passages 100 may be adjusted in airfoil 40 to enable passage diameter adjustments without violating minimum wall thickness requirements.

Moreover, in alternative embodiments, the camber line pattern 140 may shift slightly or vary from mean camber line 142 to facilitate effective cooling of the airfoil.

As shown, the plurality of cooling passages 100 includes first 102, second 104, third 106, fourth 108, and fifth 110 cooling passages, that each extend through the airfoil section 40. For reference, first cooling passage 102 is positioned closest to a leading edge 150 (shown in FIG. 6) and fifth cooling passage 110 is positioned closest to a trailing edge 152 (shown in FIG. 6). In an exemplary embodiment, diameters 160, 162, 164, and 166 of the first 102, second 104, third 106, and fourth 108 cooling passages, respectively, are approximately 0.070 inches through airfoil 40. In other words, in the exemplary embodiment, diameters 160, 162, 164, and 166 are approximately 0.070 inches between line 2-2 (i.e., root 120, shown in FIG. 2) and line 3-3 (i.e., tip 122, shown in FIG. 2). In the exemplary embodiment, a diameter 168 of the fifth cooling passage 110 through airfoil 40 is approximately 0.050 inches. In an example embodiment, diameters of the cooling passages have a dimensional tolerance of about ±0.005 inches.

In an exemplary embodiment, first 102, second 104, third 106, fourth 108, and fifth 110 cooling passages also extend through shank 44 and dovetail 46. In the exemplary embodiment, the diameters 160, 162, 164, 166, and 168 are larger between line 1-1 and line 2-2 (shown in FIG. 2). In the exemplary embodiment, diameters 160, 162, 164, and 166 are 0.140 inches between line 1-1 and line 2-2, and diameter 168 is 0.100 inches between line 1-1 and line 2-2.

Airfoil section 40 cooling passage exit locations are relocated to allow for diameter maximization without violation of minimum wall thickness requirements on one side while leaving excessive margin on the other. The exit locations are defined at the lower surface 78 of bucket 22 and at the tip 122 of the airfoil section 40.

Table II provides exemplary cooling passage locations and hole diameters within turbine bucket 22. Locations and diameters are provided in inches, and also provided in millimeters (e.g., the first passage 102 has diameter 160 from line 1-1 to line 2-2 of 0.140 inches or 3.56 millimeters).

(i.e., upper section). While the distance Z is the distance from datum U. Thus, the origin of the coordinate system lies at the intersection of datum S, T and U. FIG. 6 is a cross-sectional view of turbine bucket 22 taken along line 1-1. FIG. 7 is a cross-sectional view of turbine bucket 22 taken along line 2-2, which is also an intersection of the shank and airfoil cooling passages. FIG. 8 is a cross-sectional view of turbine bucket 22 taken along line 3-3. In the exemplary embodiment, passages 100 are formed using Shaped Tube Electrochemical Machining (STEM).

The above described embodiments of a turbine bucket provide a cost-effective and reliable replacement for currently-used stage 2 buckets. The above described buckets maintain original supply conditions and similar repair strategies as the buckets being replaced while maintaining and/or improving turbine performance and bucket life.

Exemplary embodiments of a bucket for a turbine and a turbine engine are described above in detail. The air cooled bucket and turbine engine are not limited to the specific embodiments described herein, but rather, components may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bucket for a turbine, said bucket comprising:
   a dovetail portion configured to couple said bucket to a turbine wheel, said dovetail portion comprising a lower surface;
   a shank portion extending from said dovetail portion;

TABLE II

| Hole Number | Hole Diameter from 1 to 2 | Hole Diameter from 2 to 3 | Lower Section | | Middle Section | | Upper Section | |
|---|---|---|---|---|---|---|---|---|
| | | | X | Y | X | Y | X | Y |
| 102 | 0.140 | 0.070 | −0.888 | 0.000 | −0.682 | 0.096 | −0.293 | 0.583 |
| | [3.56] | [1.78] | [22.56] | [0.0] | [17.32] | [2.44] | [7.44] | [14.81] |
| 104 | 0.140 | 0.070 | −0.420 | 0.000 | −0.304 | 0.089 | −0.075 | 0.352 |
| | [3.56] | [1.78] | [10.67] | [0.0] | [7.72] | [2.26] | [1.90] | [8.94] |
| 106 | 0.140 | 0.070 | 0.083 | 0.000 | 0.083 | 0.125 | 0.174 | −0.047 |
| | [3.56] | [1.78] | [2.11] | [0.0] | [2.11] | [3.18] | [4.42] | [1.19] |
| 108 | 0.140 | 0.070 | 0.586 | 0.000 | 0.469 | 0.058 | 0.312 | −0.372 |
| | [3.56] | [1.78] | [14.88] | [0.0] | [11.91] | [1.47] | [7.92] | [9.45] |
| 110 | 0.100 | 0.050 | 0.905 | 0.000 | 0.891 | −0.274 | 0.563 | −0.978 |
| | [2.54] | [1.27] | [22.99] | [0.0] | [22.63] | [6.96] | [14.30] | [24.84] |

With reference to FIGS. 6-8, the origin of the X, Y, Z Cartesian coordinate system referenced in Table II used to locate the cooling passages is the intersection of the S, T, and U datum planes. These datum planes are identified in the drawings. The distance X to the center of the holes is the distance from datum T and the distance Y is the distance from datum S. Values for a distance X and a distance Y are provided at three distances from datum U. More specifically, values for a distance X and a distance Y are provided at line 1-1 (i.e., lower section), at line 2-2 (i.e., middle section), and at line 3-3 an airfoil comprising a root portion, a tip portion, an airfoil shape, and a nominal profile substantially in accordance with Cartesian coordinate values of X, Y, and Z set forth in Table I, wherein Z is a distance from said lower surface of said dovetail portion, and X and Y are coordinates defining the profile at each distance Z from said lower surface; and a plurality of cooling passages, said plurality of cooling passages comprising no more than five cooling passages extending between said root and said tip portion of said airfoil, each of said cooling passages exits at said tip portion, said plurality of cooling passages are positioned in a camber line pattern.

2. A bucket in accordance with claim 1 wherein said plurality of cooling passages are positioned at said tip and root portions of said airfoil substantially in accordance with X and Y Cartesian coordinate values set forth in Table II.

3. A bucket in accordance with claim 1 wherein said plurality of cooling passages are aligned substantially parallel to each other.

4. A bucket in accordance with claim 1 wherein a first, a second, a third, and a fourth of said plurality of cooling passages each have a diameter of about 0.070 inches±0.005 inches from said root to said tip portion of said airfoil, and a fifth of said plurality of cooling passages has a diameter of about 0.050 inches±0.005 inches from said root to said airfoil tip portion.

5. A bucket in accordance with claim 4 wherein at least one of said first, second, third, fourth, and fifth cooling passages has a larger diameter defined within said dovetail and said shank portions than in said airfoil.

6. A bucket in accordance with claim 1 wherein said plurality of cooling passages facilitate extending a useful life of said airfoil.

7. A bucket in accordance with claim 1 wherein said plurality of cooling passages facilitate maintaining a desired airfoil temperature within said airfoil with a predetermined air flow through said plurality of cooling passages.

8. A bucket in accordance with claim 1 wherein said plurality of cooling passages facilitate increasing creep margins throughout said airfoil.

9. A bucket in accordance with claim 1 wherein said airfoil further comprises a coating extending at least partially over each side of said airfoil.

10. A bucket in accordance with claim 1 wherein said dovetail portion, said shank portion, and said airfoil are integrally cast together, said plurality of cooling passages are each defined adjacent to each of a pressure side and a suction side of said airfoil.

11. A bucket in accordance with claim 1 wherein said bucket is cast from a nickel-based superalloy.

12. A gas turbine engine comprising:
a rotor comprising at least one rotor wheel; and
a plurality of buckets extending radially from said at least one rotor wheel, each of said plurality of buckets comprises a dovetail portion, a shank portion, an airfoil, and a plurality of cooling passages extending therethrough, said airfoil has a nominal profile formed substantially in accordance with Cartesian coordinate values of X, Y, and Z set forth in Table I, wherein Z is a distance from a lower surface of said dovetail portion, and X and Y are coordinates defining the profile at each distance Z from a lower surface of said dovetail portion, said plurality of cooling passages each extend between said lower surface of said dovetail portion and a tip portion of each airfoil, said plurality of cooling passages comprise no more than five cooling passages positioned in a camber line pattern.

13. A gas turbine engine in accordance with claim 12 wherein said plurality of cooling passages are each positioned at said tip portion of said airfoil, at a root portion of said airfoil, and at said lower surface of said dovetail portion substantially in accordance with X and Y Cartesian coordinate values set forth in Table II.

14. A gas turbine engine in accordance with claim 12 wherein said plurality of cooling passages are substantially parallel to each other.

15. A gas turbine engine in accordance with claim 13 wherein a first, a second, a third, and a fourth of said plurality of cooling passages each have a diameter of about 0.070 inches±0.005 inches from said root portion to said tip portion of said airfoil, and a fifth of said plurality of cooling passages has a diameter of about 0.050 inches±0.005 inches from said root portion to said tip portion of said airfoil.

16. A gas turbine engine in accordance with claim 15 wherein at least one of said first, second, third, fourth, and fifth of said plurality of cooling passages has a larger diameter defined within said dovetail and shank portions than defined in said airfoil.

17. A gas turbine engine in accordance with claim 12 wherein said cooling passages facilitate extending a useful life of said airfoil, and facilitate increasing creep margins throughout said airfoil.

18. A gas turbine engine in accordance with claim 12 wherein said plurality of cooling passages facilitate maintaining a desired airfoil temperature within said airfoil with a predetermined air flow through said plurality of cooling passages.

19. A gas turbine engine in accordance with claim 12 wherein said dovetail portion, said shank portion, and said airfoil are integrally cast together to form each of said plurality of buckets, said plurality of cooling passages are each defined adjacent to each of a pressure side and a suction side of said airfoil.

20. A multi-stage gas turbine engine in accordance with claim 12 wherein said plurality of buckets are cast from a nickel-based superalloy.

* * * * *